United States Patent
De Kievit et al.

(10) Patent No.: US 12,114,162 B2
(45) Date of Patent: Oct. 8, 2024

(54) MASTER BASE STATION, SECONDARY BASE STATION, USER EQUIPMENT (UE), AND METHOD

(71) Applicant: NEC Corporation, Tokyo (JP)

(72) Inventors: Sander De Kievit, Tokyo (JP); Takahito Yoshizawa, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 531 days.

(21) Appl. No.: 17/427,784

(22) PCT Filed: Feb. 7, 2020

(86) PCT No.: PCT/JP2020/004886
§ 371 (c)(1),
(2) Date: Aug. 2, 2021

(87) PCT Pub. No.: WO2020/162610
PCT Pub. Date: Aug. 13, 2020

(65) Prior Publication Data
US 2022/0132316 A1    Apr. 28, 2022

(30) Foreign Application Priority Data
Feb. 8, 2019 (EP) .................................. 19156267

(51) Int. Cl.
| | |
|---|---|
| *H04W 12/12* | (2021.01) |
| *H04W 12/02* | (2009.01) |
| *H04W 12/033* | (2021.01) |
| *H04W 12/041* | (2021.01) |
| *H04W 12/0471* | (2021.01) |
| *H04W 12/06* | (2021.01) |
| *H04W 12/08* | (2021.01) |
| *H04W 12/106* | (2021.01) |
| *H04W 76/15* | (2018.01) |
| *H04W 88/02* | (2009.01) |

(52) U.S. Cl.
CPC ....... *H04W 12/106* (2021.01); *H04W 12/033* (2021.01); *H04W 12/041* (2021.01); *H04W 12/0471* (2021.01); *H04W 76/15* (2018.02)

(58) Field of Classification Search
CPC .............. H04W 12/106; H04W 76/15; H04W 12/0471; H04W 12/041; H04W 12/033
See application file for complete search history.

(56) References Cited

U.S. PATENT DOCUMENTS

2019/0149997 A1* 5/2019 Liao ..................... H04W 76/15
                                                                                455/411
2019/0394651 A1   12/2019 Wifvesson et al.

FOREIGN PATENT DOCUMENTS

WO       2018/138379 A1    8/2018

OTHER PUBLICATIONS

International Search Report for PCT Application No. PCT/JP2020/004886, mailed on May 4, 2020.
English translation of Written opinion for PCT Application No. PCT/JP2020/004886, mailed on May 4, 2020.

(Continued)

*Primary Examiner* — Moustapha Diaby
(74) *Attorney, Agent, or Firm* — Sughrue Mion, PLLC

(57) ABSTRACT

This disclosure introduces methods and mechanisms of integrity protection in 4G and 5G system, especially in the context of Dual Connectivity (DC) involving both 4G and 5G base stations.

2 Claims, 24 Drawing Sheets

(56) References Cited

OTHER PUBLICATIONS

3rd Generation Partnership Project, "Technical Specification Group Radio Access Network; Evolved Universal Terrestrial Radio Access (E-UTRA) and NR; Multi-connectivity; Stage 2 (Release 15)", 3GPP TS 37.340 V15.3.0. Sep. 2018, pp. 1-59.

3rd Generation Partnership Project, "Technical Specification Group Services and System Aspects; 3GPP System Architecture Evolution (SAE); Security architecture (Release 15)", 3GPP TS 33.401 V15.6.0, Dec. 2018, pp. 1-163.

3rd Generation Partnership Project, "Technical Specification Group Services and System Aspects; Security architecture and procedures for 5G system (Release 15)", 3GPP TS 33.501 V15.3.0, Dec. 2018, pp. 1-180.

3rd Generation Partnership Project. "Technical Specification Group Radio Access Network, Evolved Universal Terrestrial Radio Access (E-UTRA): Packet Data Convergence Protocol (PDCP) specification (Release 15)", 3GPP TS 36.323 V15.1.0, Sep. 2018, pp. 1-51.

3rd Generation Partnership Project, "Technical Specification Group Radio Access Network; NR; Packet Data Convergence Protocol (PDCP) specification (Release 15)", 3GPP TS 38.323 V15.3.0. Sep. 2018, pp. 1-26.

3rd Generation Partnership Project, "Technical Specification Group Radio Access Network; Evolved Universal Terrestrial Radio Access (E-UTRA); Radio Resource Control (RRC); Protocol specification (Release 15)", 3GPP TS 36.331 V15.3.0, Sep. 2018, pp. 1-918.

3rd Generation Partnership Project, "Technical Specification Group Services and System Aspects; Security architecture and procedures for 5G system (Release 15)", 3GPP TS 33.501 V15.3.1, Dec. 2018, pp. 1-180.

3rd Generation Partnership Project, "Technical Specification Group Services and System Aspects; Study on the Security for 5G URLLC (Release 16)", 3GPP TR 33.825 V0.3.0, Jan. 2019, pp. 1-17.

Huawei et al., "Handling of UP security policy in MR-DC", 3GPP S3-183835, 3GPP TSG-SA WG3 Meeting #93, Spokane, US, Nov. 12-16, 2018.

* cited by examiner

MASTER BASE STATION, SECONDARY BASE STATION, USER EQUIPMENT (UE), AND METHOD

This application is a National Stage Entry of PCT/JP2020/004886 filed on Feb. 7, 2020, which claims priority from European Patent Application 19156267.7 filed on Feb. 8, 2019, the contents of all of which are incorporated herein by reference, in their entirety.

TECHNICAL FIELD

The present disclosure relates to a communication system. The disclosure has particular but not exclusive relevance to wireless communication systems and devices thereof operating according to the 3rd Generation Partnership Project (3GPP) standards or equivalents or derivatives thereof. The disclosure has particular although not exclusive relevance to improvements relating to integrity protection in the so-called '5G' (or 'Next Generation') systems.

BACKGROUND ART

Abbreviations

3GPP 3rd Generation Partnership Project
4G 4th Generation
5G 5th Generation
5GC 5th Generation Core network
AN Access Network
AS Access Stratum
CP Control Plane
CPF Control Plane Function
DC Dual Connectivity
DL DownLink
DRB Data Radio Bearer
EN-DC E-UTRA-NR Dual Connectivity
en-gNB Enhanced gNB
EPC Evolved Packet Core (4G CN)
E-UTRA Evolved Universal Terrestrial Radio Access
eNB Evolved NodeB (4G base station)
ePDG Evolved Packet Data Gateway
gNB Next-Generation NodeB (5G base station)
GW GateWay
IP Integrity Protection
MCG Master Cell Group
MeNB Master eNB
MgNB Master gNB
MN Master Node
MR-DC Multi-RAT Dual Connectivity
N3IWF Non-3GPP access InterWorking Function
NAS Non-Access Stratum
NE-DC NR-E-UTRA Dual Connectivity
NG Next Generation
ng-eNB Next generation-evolved NodeB
NGEN-DC NG-RAN E-UTRA-NR Dual Connectivity
NR Next-generation Radio
PDCP Packet Data Convergence Protocol
RAN Radio Access Network
RAT Radio Access Technology
RB Radio Bearer
RN Relay Node
SCG Secondary Cell Group
SeNB Secondary eNB
SgNB Secondary gNB
S-GW Serving GateWay
SMC Security Mode Command
SMF Session Management Function
SN Secondary Node
SRB Signaling Radio Bearer
TS Technical Specification
UE User Equipment
UL UpLink
UP User Plane
UPF User Plane Function
UP IP User Plane Integrity Protection
UP TS User Plane Security Termination
Uu Interface between the base station and the UE

BACKGROUND

In 3GPP Release 15, as the first 5G specification ("5G phase 1"), 3GPP has defined the Dual Connectivity (DC) involving both 4G (LTE) and 5G base stations. It is generally referred to as Multi-Radio Dual Connectivity (MR-DC). Architectural description of Dual Connectivity is described in 3GPP TS 37.340 [1]. Dual connectivity is a mechanism in which the UE is connected to multiple base stations simultaneously and have Radio Bearer (RB) with both of them. In MR-DC, one of the base stations is 4G (LTE) and another base station is 5G. 4G base station is called evolved NodeB (eNB) and 5G base station is called next-Generation NodeB (gNB).

In the Uu interface (e.g. radio connection between the base station and the UE), Radio Bearer (RB) is used to carry traffic. Control Plane (CP) signaling traffic is carried over Signaling Radio Bearer (SRB), and User Plane traffic is carried over Data Radio Bearer (DRB).

In DC scenario, one of the base stations is assigned as the role of Master Node (MN) and the other base station is assigned as the role of Secondary Node (SN). In Master Node, both the CP signaling traffic and UP data traffic are terminated. The MN determines to offload one or more DRBs to the Secondary Node (SN). Depending on the assignment of Data Radio Bearer (DRB), one or more DRBs may be assigned to the MN, and some of them may be offloaded to the SN.

In MR-DC, both 4G and 5G base stations are involved. There are multiple scenarios (or variations) in terms of the role of MN and SN, and which generation CN is used.
1. E-UTRA-NR Dual Connectivity (EN-DC)
2. NG-RAN E-UTRA-NR Dual Connectivity (NGEN-DC)
3. NR-E-UTRA Dual Connectivity (NE-DC)

These scenarios are illustrated in the FIG. 1.

In EN-DC scenario, the EPC (4G CN) is used. The eNB (4G base station) assumes the role of the MN (MeNB), and the en-gNB (5G base station that supports backward-compatible 4G interfaces to eNB and EPC) assumes the role of the SN (SgNB).

In NGEN-DC scenario, the 5GC (5G CN) is used. The ng-eNB (4G base station that supports forward-compatible 5G interfaces to 5GC and gNB) assumes the role of the MN (MeNB), and gNB (5G base station) assumes the role of the SN (SgNB).

In NE-DC scenario, the gNB (5G base station) assumes the role of the MN (MgNB), and the ng-eNB (4G base station that supports forward-compatible 5G interfaces to 5GC and gNB) assumes the role of the SN (SeNB).

Security Issues in MR-DC and the Related Background Art:

From security perspective, one notable difference between 4G and 5G systems is the difference in the support of User Plane (UP) Integrity Protection (IP). In particular, in 4G system, support of UP IP is not mandated, thus not supported in reality according to 3GPP TS 33.401 [2]. On the other hand, in 5G system, the support of UP IP is mandatory and optional to use according to 3GPP TS 33.501 [3]. Therefore, it is possible to support UP IP in 5G system.

In both 4G and 5G systems, ciphering and integrity protection are done in PDCP layer as defined in 3GPP TS 36.323 [4] and 38.323 [5], respectively. FIG. 2 and FIG. 3 show the 4G and 5G PDCP functions, respectively. As shown in FIG. 2, integrity protection is applied to control plane only in 4G, while it is applied to both control plane and user plane in 5G.

The security aspect of MR-DC, including the above-mentioned 3 scenarios, is described in 3GPP TS 33.401 [2] and TS 33.501 [3]. Due to the difference in the UP IP support in 4G and 5G systems, the use of UP IP in eNB is specified in [2] and [3] as follows:

[EN-DC scenario] When the gNB is connected to the EPC, then the UP IP is not used in gNB because the eNB does not support UP IP.

[NGEN-DC or NE-DC scenarios] When the gNB is connected to 5GC and if the UP security policy indicates UP integrity protection is required, then:
  [NGEN-DC scenario] The MN (MeNB) rejects the PDU session because the MN being an eNB does not support UP IP.
  [NE-DC scenario] If the MN (MgNB) activates the UP IP for the PDU session, then the MN (MgNB) does not offload any DRB of the PDU session to the SN (SeNB). This is because the MN (MgNB) supports UP IP, but the SN being an eNB does not support the UP IP.

[NGEN-DC or NE-DC scenarios] When the gNB is connected to 5GC and if the UP security policy indicates UP integrity protection is preferred, then:
  [NGEN-DC scenario] The MN (MeNB) always deactivates UP IP. The SN (SgNB) always deactivates the UP IP of any PDU session terminated at the SN. This is because MN being an eNB does not support UP IP and thus is not able to indicate to the SN (SgNB) regarding the use of UP IP.
  [NE-DC scenario] If the MN (MgNB) activates any of the PDU session DRBs with UP IP, the MN (MgNB) does not offload any DRB on this PDU session to the SN (SeNB). This is because the SN being an eNB does not support UP IP.
  [NE-DC scenario] If the MN (MgNB) activates any of the PDU session DRBs without UP IP, the MN may offload DRBs of this PDU session to the SN (SeNB). In this case, the SN accepts the DRBs always disabling the UP IP. This is because the SN being an eNB does not support UP IP.

[NGEN-DC or NE-DC scenarios] When the gNB is connected to 5GC and if the UP security policy indicates UP integrity protection is not needed, then:
  [all scenarios] the MN and SN always activate DRBs disabling the UP IP.

In summary, because of the above described difference in the absence or presence of UP IP support functionality in 4G and 5G systems, the current MR-DC solution in the 3GPP specifications has constraints in terms of: 1) MN not being able to accept DRB assignment from the CN in all scenarios depending on the indicated use of UP IP at the time of DRB creation, 2) MN not being able to offload DRBs to the SN depending on the type of SN (e.g. eNB or gNB) and the use of UP IP.

SUMMARY OF INVENTION

Technical Problem

Problem Description

Based on the discussion above, we can state the problem as follows:

In 4G (LTE) system, the base station (eNB) and UE do not support User Plane Integrity Protection (UP IP). On the other hand, in 5G system, the base station (gNB) and UE support UP IP. In Multi-Radio Dual Connectivity (MR-DC) scenarios where 4G eNB and 5G gNB are combined to provide connectivity to the UE over 4G and 5G Uu interfaces, the UE is simultaneously connected to base stations with mixed UP IP capabilities. Because of this difference in the absence or presence of UP IP support functionality in 4G and 5G systems, the current MR-DC solution in the 3GPP specifications has a problem of either rejecting the PDU session establishment or accept the PDU session establishment with UP IP disabled.

Due to the above problem, the current MR-DC solution in the 3GPP specifications has constraints in terms of:
1) MN not being able to accept DRB assignment from the CN in some scenarios depending on the indicated use of UP IP from the CN at the time of DRB assignment,
2) MN not being able to offload DRBs to the SN in some scenarios depending on the type of SN (e.g. eNB or gNB) and the use of UP IP.
3) In the current 5G specification, the CN (SMF) needs to manage the UE security policy for PDU sessions of all UEs individually.

Solution to Problem

According to an aspect of the present disclosure, a master base station used in dual connectivity includes: a memory; and a processor including hardware. The processor is configured to: send a request including user plane integrity protection (UP IP) decision related information to a secondary base station; and receive an indication of UP IP from the secondary base station.

According to another aspect of the present disclosure, a secondary base station used in dual connectivity includes: a memory; and a processor including hardware. The processor is configured to: receive a request including user plane integrity protection (UP IP) decision related information from a master base station; send an indication of UP IP to the master base station; and activate the UP IP based on the information.

According to another aspect of the present disclosure, a user equipment (UE) includes: a memory; and a processor including hardware. The processor is configured to: receive an RRC Connection reconfiguration request including an indication of user plane integrity protection (UP IP) from a master base station used in dual connectivity, the master base station receiving the indication; and activate the UP IP based on the indication.

According to another aspect of the present disclosure, a method performed in a master base station used in dual connectivity includes: sending a request including user plane integrity protection (UP IP) decision related information to a secondary base station; and receiving an indication of UP IP from the secondary base station.

According to another aspect of the present disclosure, a method performed in a secondary base station used in dual connectivity includes: receiving a request including user plane integrity protection (UP IP) decision related information from a master base station; sending an indication of UP IP to the master base station; and activating the UP IP based on the information.

According to another aspect of the present disclosure, a method performed in a user equipment (UE) includes: receiving a RRC Connection reconfiguration request including an indication of user plane integrity protection (UP IP) from a master base station used in dual connectivity, the master base station receiving the indication; and activating the UP IP based on the indication.

Advantageous Effects of Invention

In certain aspects, a master base station, a secondary base station, a user equipment, a method performed in a master base station, a method performed in a secondary base station, and a method performed in a user equipment may provide a technology for solving the problems as described above.

DESCRIPTION OF EMBODIMENTS

Detailed Description

In this disclosure, we address the constraints in the MR-DC scenarios as described in the problem statement in the previous section. Specifically, we propose schemes where both constraints are removed. In other words:
  MN can accept all DRB assignment from the CN irrespective of the indicated use of UP IP from the CN at the time of DRB assignment
  MN can offload DRBs to the SN irrespective of the type of SN (e.g. eNB or gNB) and the use of UP IP.
Solution 0, Description—Minimum Configuration In this solution variant, the DRBs are assigned so that all the MN, SN and UE can use UP IP on the path of DRBs when new DRBs are set up for a UE. For this, the (R)AN node requests another entity to set up the DRBs so that all the MN, SN and UE can use UP IP on the path of DRBs.

In some aspects, the MN (eNB) requests to set up a new DRB path to be routed through the SN (gNB) where the UP IP can be supported, to the SN. In other aspects, the MN (gNB) requests to set up a new DRB path and to apply confidentiality protection only over the LTE Uu interface so that the UP IP is handled in the MN. In other aspects, the MN (eNB) triggers the UE to establish IPsec tunnel with the network, to use UP IP on the path of DRBs. In other aspects, the SN (eNB) triggers the UE to establish IPsec tunnel with the network, to use UP IP on the path of DRBs. In other aspects, the MN triggers the UE to establish IPsec tunnel with both 4G and 5G network, to use UP IP on the path of DRBs. In other aspects, the eNB requests to establish the 4G Uu interface with the UE as the RN link in which UP IP is supported.

In some aspects, when the (R)AN node requests another entity to set up the DRBs so that all the MN, SN and UE can use UP IP on the path of DRBs, the (R)AN node may query the UE's UP IP capability to the UE. Then the (R)AN node may determine whether to apply UP IP for the DRB or not based on the UP IP capability provided from the UE. In other aspects, when the (R)AN node requests another entity to set up the DRBs so that all the MN, SN and UE can use UP IP on the path of DRBs, the (R)AN node may determine whether to offload the bearer to the other (R)AN node based on various criteria. The (R)AN node may use various criteria upon determining offloading DRB to the other (R)AN node including, but not limited to, the followings. Alternatively, the criteria may be a combination of one or more of the following:
  Traffic type
  Application type
  QoS requirement
  Required data rate in the Uu interface
  Available capacity in the Uu interface
  Traffic or processing load on the MN
  Traffic or processing load on the SN
  Relative load between the MN and the SN
  Operator policy or preference
  UE choice (e.g. user configuration setting)

The advantage in this solution variant is to prevent the rejection of PDU session establishment.

Figure 4:
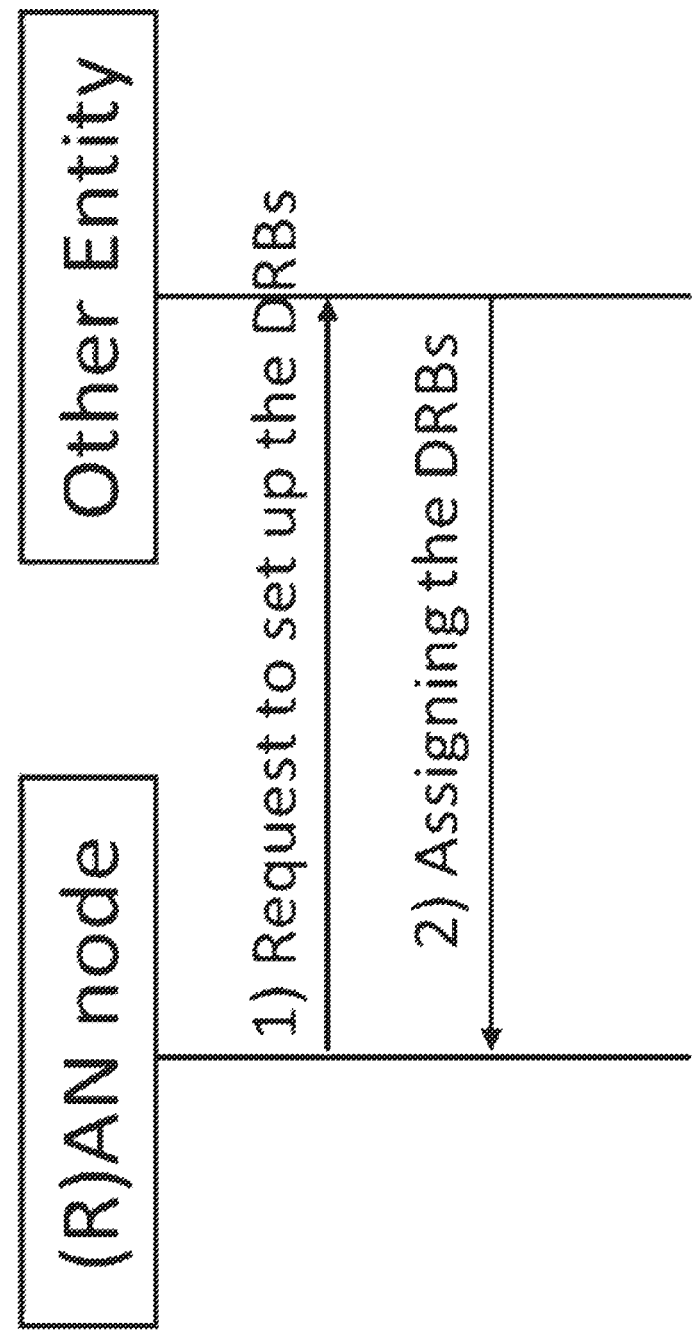
FIG. 4 is a view showing an example of message flow in minimum configuration.

FIG. 4 illustrates schematically an exemplary message flow in minimum configuration:

1. The (R)AN node requests another entity to set up the DRBs so that all the MN, SN and UE can use UP IP on the path of DRBs.
2. The other entity indicates to the (R)AN node that the DRBs are assigned so that all the MN, SN and UE can use UP IP on the path of DRBs Solution 1, Description—DRB Under gNB Solution 1, Variant 1—DRB Routed Through gNB In this solution variant, DRBs are assigned to either MN or SN. If the DRB is assigned to the gNB, then the DRB is directly to the UE over the 5G Uu interface. In this case, UP IP can be directly applied over the 5G Uu interface.

On the other hand, if the DRB is assigned to the eNB, then the UP bearer for this DRB is routed through the gNB over X2 or Xn interface, depending on the type of CN used in the scenario. Then the UP IP can be applied between the gNB and the UE over 5G Uu interface. In this way, UP IP can be applied to all DRBs irrespective of where the DRB is terminated.

The cases where the routing through gNB is required is the following cases;

In EN-DC and NGEN-DC scenarios, the DRB is assigned as the MCG bearer (eNB)

In NE-DC scenario, the DRB is offloaded to the SCG bearer (eNB)

The SRB assignment is done to the MN irrespective of the scenario:

Assigned to eNB if it is a MN (EN-DC and NGEN-DC scenarios)

Assigned to gNB if it is a MN (NE-DC scenario)

The advantage in this solution variant is that DRBs can be distributed between MN and SN in all scenarios even though the eNB does not support UP IP.

Figure 5:
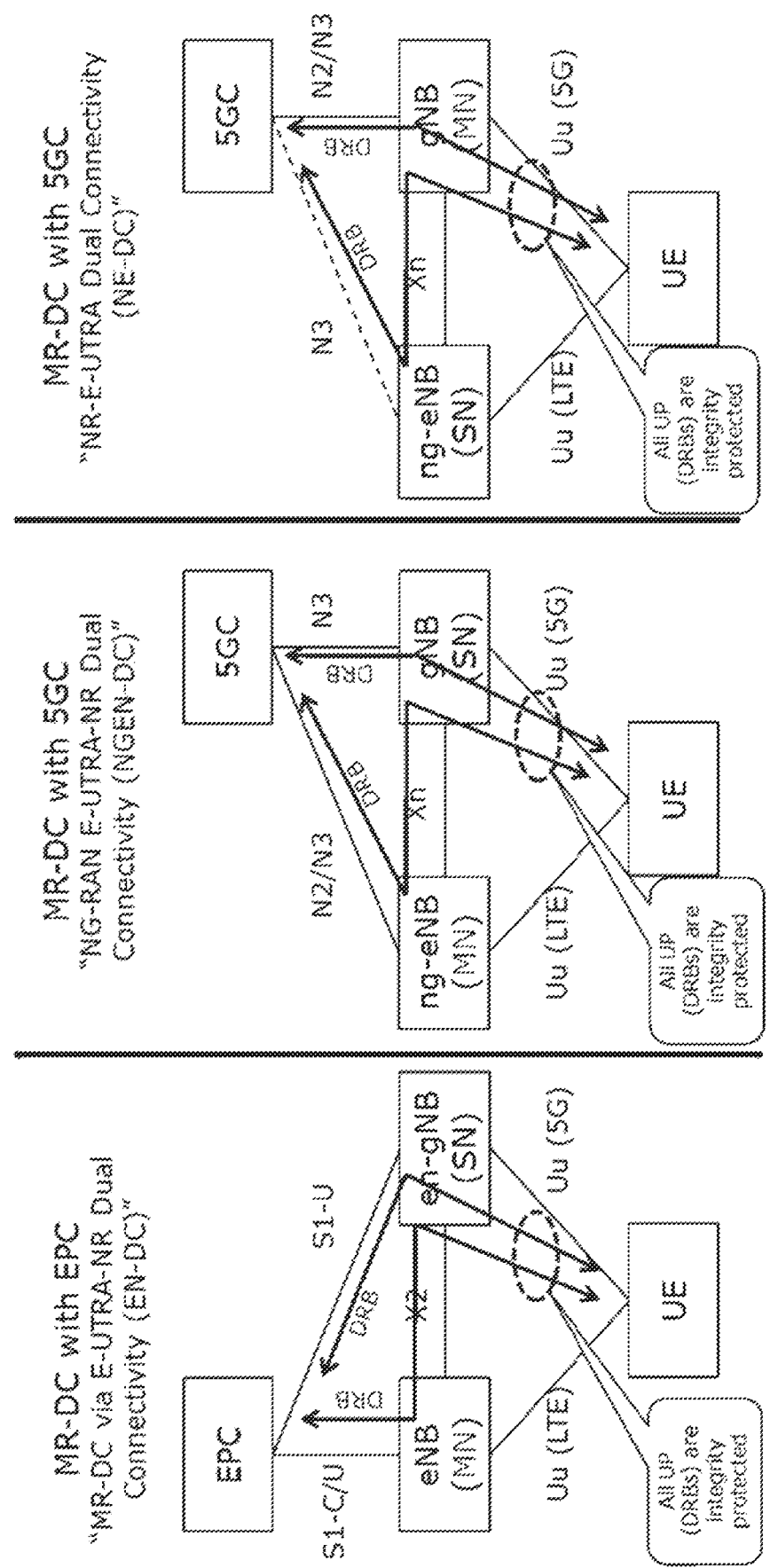
FIG. 5 is a view showing an example of DRB routed through gNB.

FIG. 5 illustrates this solution in all 3 scenarios.

In this solution variant, if the MN is gNB (NE-DC scenario), the MN (gNB) accepts a new DRB set up request from the CN and allocates the corresponding DRB to itself. This way, the DRB handling is done at the gNB which can support UP IP. In this case, the MN (gNB) serves all DRBs and does not offload any DRB to the SN (eNB) because the eNB does not support UP IP.

Figure 6:
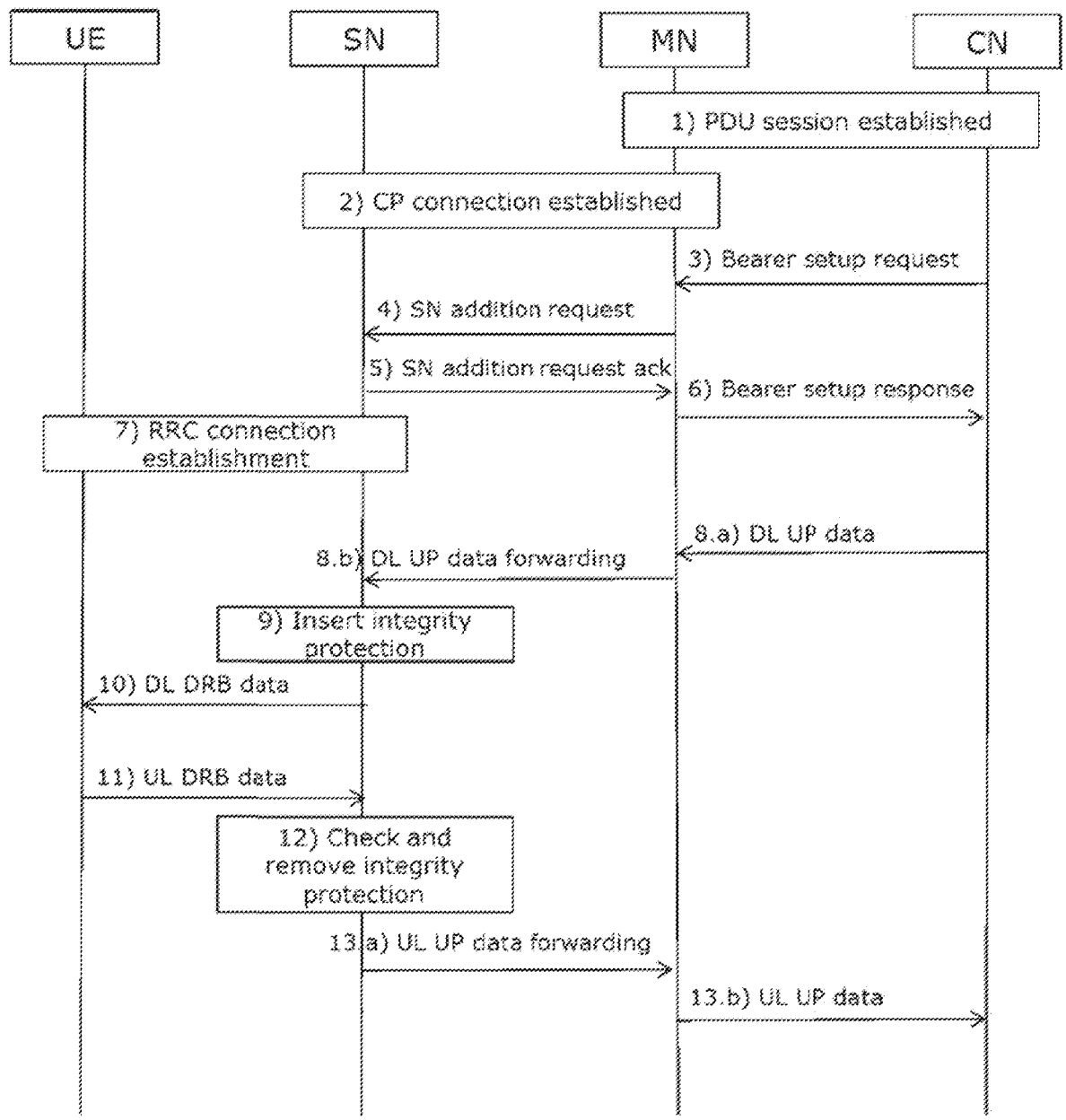
FIG. 6 is a sequence diagram showing an example of message flow in EN DC and NGEN DC scenarios.

On the other hand, if the MN is eNB (EN-DC or NGEN-DC scenarios), the MN (eNB) accepts all DRB set up requests from the CN. Upon accepting the new DRB assignment, the MN requests the forwarding of DRB to the SN (gNB). At this time, the MN (eNB) requests the SN (gNB) to apply UP IP. This way, even though the DRB is terminated at the MN (eNB) which does not support UP IP, UP IP is supported by the SN (gNB) by routing the DRB traffic in both UL and DL directions. The exemplary procedure is illustrated in FIG. 6.

It should be noted that the message names shown in this figure are for illustration purpose only—they may be replaced by the standard-defined messages in the corresponding 3GPP specifications and may map to 4G or 5G specification message names.

1. The CN and the MN (eNB) establish a PDU session.
2. The MN (eNB) and the SN (gNB) establish a CP connection.
3. The CN initiates the establishment of a new bearer to the MN (gNB) by sending a Bearer Setup Request message, for example.
4. The MN (eNB) requests the SN (gNB) to add a new bearer to route the newly requested bearer and add integrity protection over the 5G Uu interface by sending a SN Addition Request message, for example.
5. The SN (gNB) accepts the new bearer from the MN (eNB) by sending a SN addition Request Acknowledgement message, for example.
6. The MN (eNB) responds to the CN with successful establishment of a new bearer by sending a Bearer Setup Response message, for example.
7. The SN (gNB) and the UE establish RRC connection (if not already established).
8. The CN sends DL UP data to the MN (eNB) which forwards it to the SN (gNB).
9. The SN (gNB) applies the integrity protection to the DL DRB payload. Alternatively, the SN (gNB) also applies the confidentiality protection to the DL DRB, if not already done by the MN (eNB).
10. The SN (gNB) sends the DL DRB to the UE over 5G Uu interface.
11. The UE sends UL DRB with UP IP to the SN (gNB) over 5G Uu interface.
12. The SN (gNB) checks the validity of UP IP.
13. If the integrity protection check is successful, the SN (gNB) removes the integrity protection and forwards the UL DRB to the MN (eNB), which forwards it to the CN. Alternatively, the SN (gNB) also undo the confidentiality protection (de-ciphering) on the UL DRB.

Solution 1 Variant 2—Split PDCP Functionality

In this solution, DRBs are assigned to either MN or SN. If the DRB is assigned to the gNB, then the DRB is directly to the UE over the 5G Uu interface. In this case, UP IP can be directly applied over the 5G Uu interface.

On the other hand, if the DRB is assigned to the eNB, then the UP bearer for this DRB is routed through the gNB to the eNB over X2 or Xn interface, depending on the type of CN used in the scenario. Then the UP IP can be applied between the gNB and the UE over a new interface whereas confidentiality protection is applied between the eNB and the UE over the LTE-Uu interface. In this way, UP IP can be applied to all DRBs irrespective of where the DRB is terminated.

The cases where the routing through the eNB is required is the following:

In EN-DC and NGEN-DC scenarios, the DRB is offloaded as the SCG bearer (gNB)

In NE-DC scenario, the DRB is assigned as the MCG bearer (gNB)

The SRB assignment is done to the MN irrespective of the scenario:

Assigned to eNB if it is a MN (EN-DC and NGEN-DC scenarios)

Assigned to gNB if it is a MN (NE-DC scenario)

The advantage in this solution is that DRBs can be distributed between MN and SN in all scenarios even though the eNB does not support UP IP.

Figure 7:
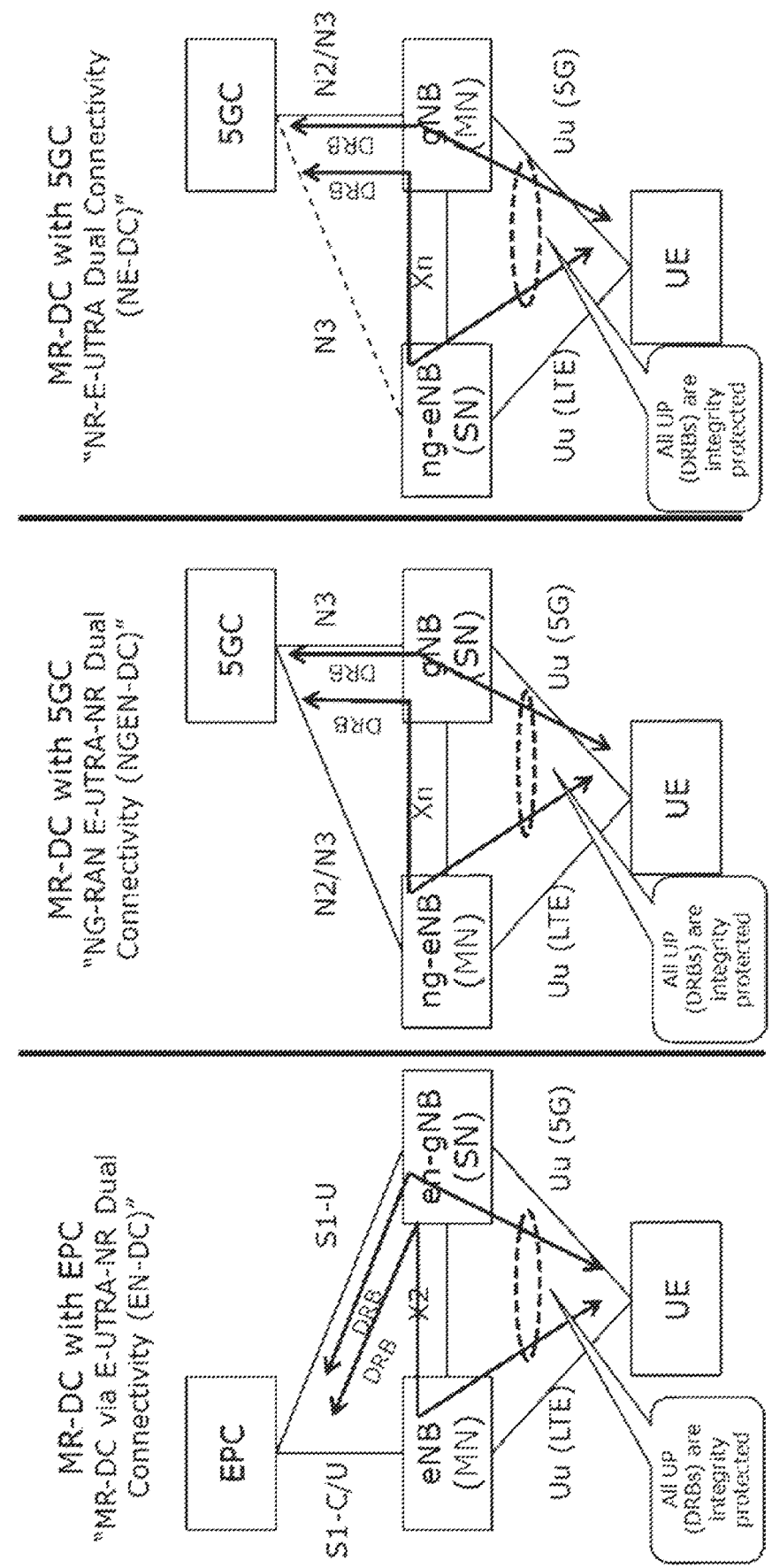
FIG. 7 is a view showing an example of DRB routed through eNB by using split PDCP in user plane.

FIG. 7 illustrates this solution in all 3 scenarios.

Figure 1:
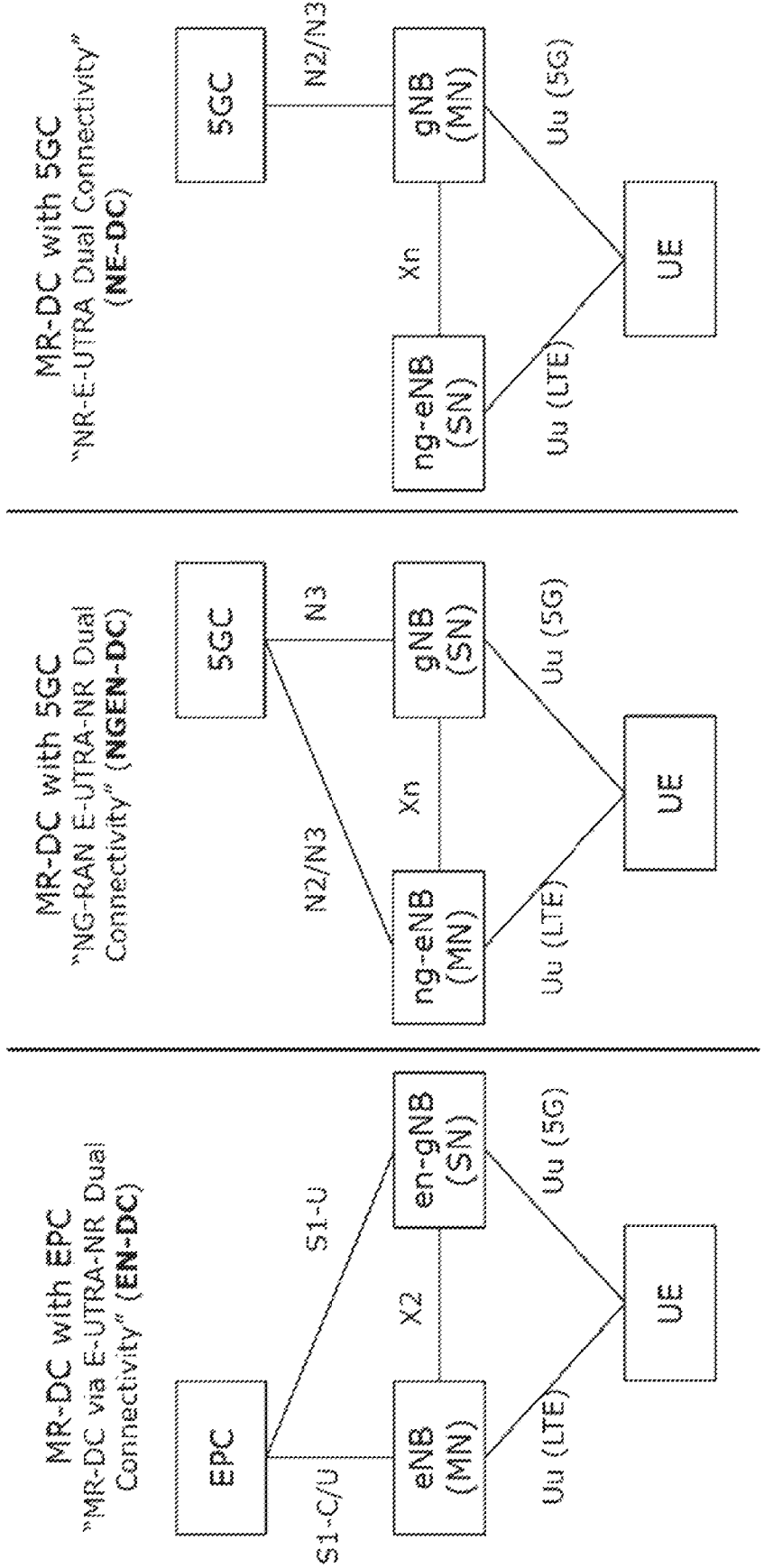
FIG. 1 is a view showing an example of MR DC scenarios.
Figure 2:
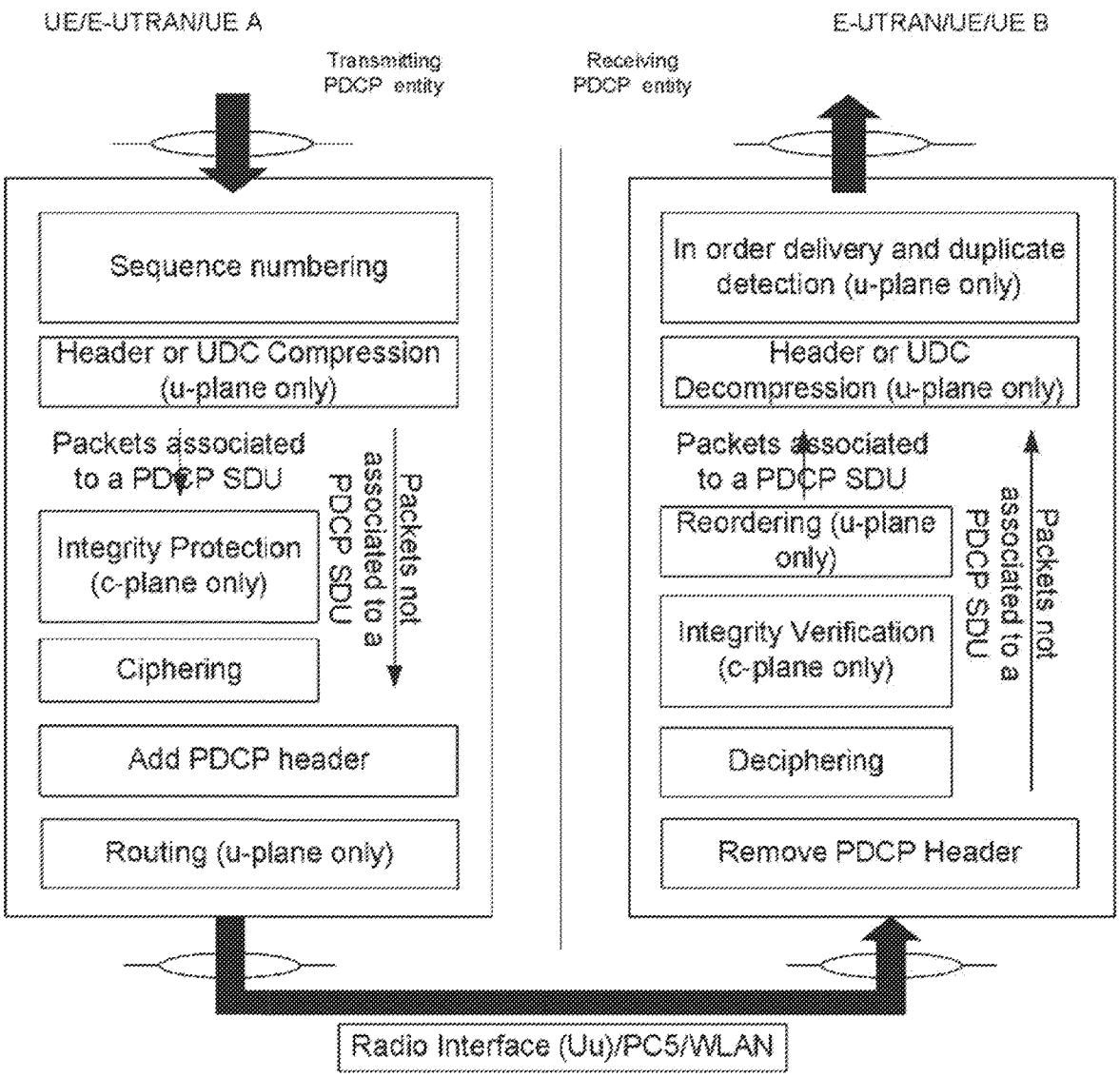
FIG. 2 is a view showing an example of 4G PDCP function.
Figure 3:
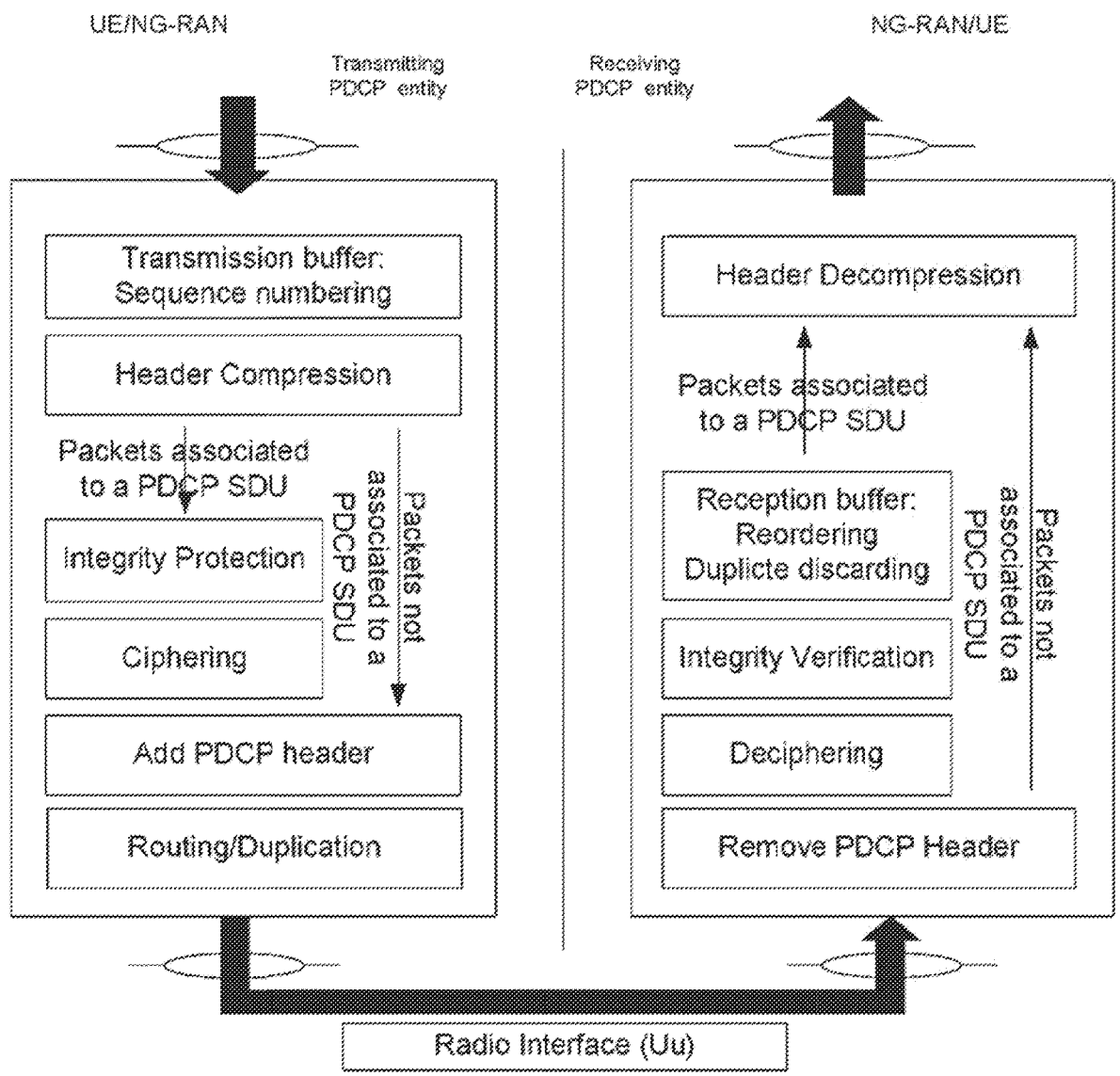
FIG. 3 is a view showing an example of 5G PDCP function.
Figure 8:
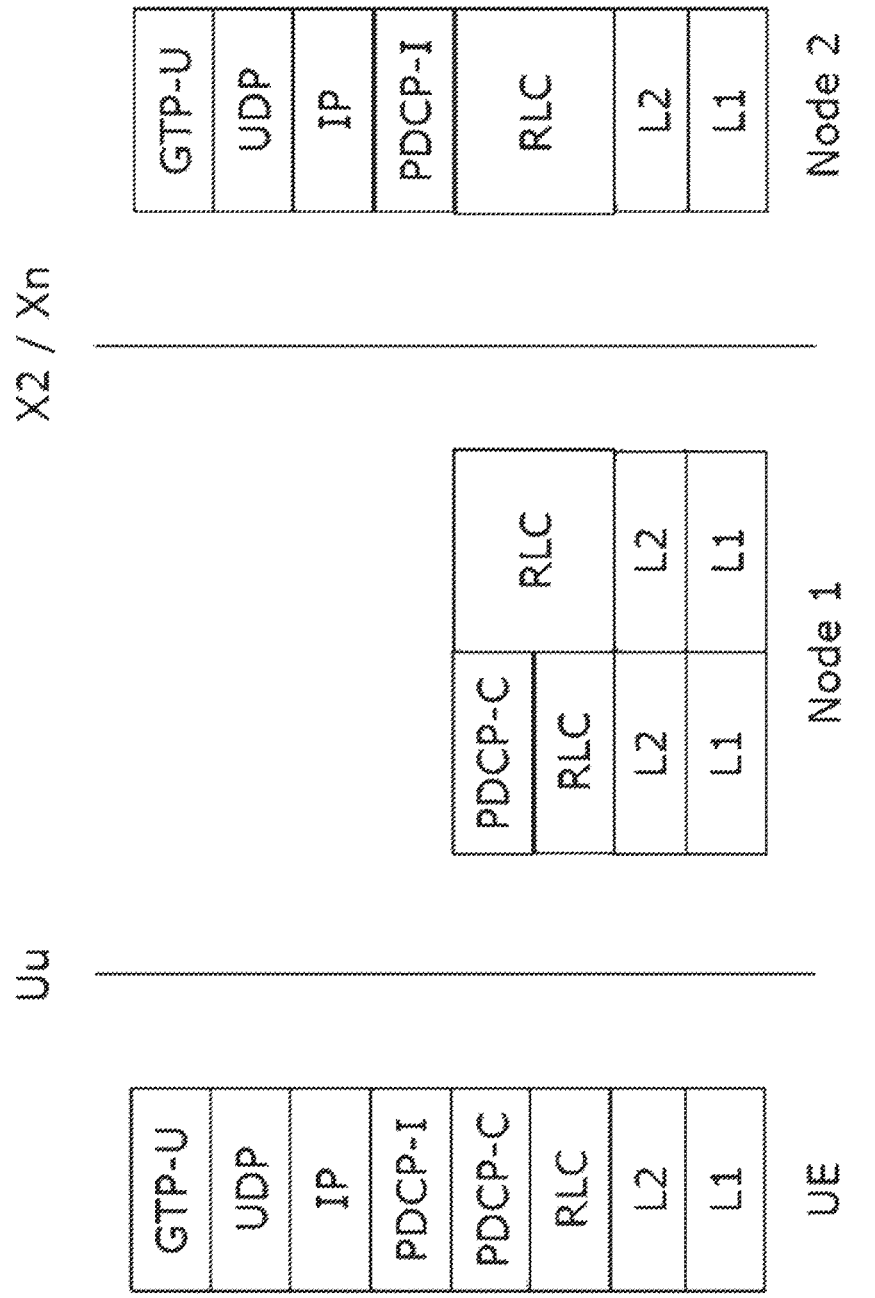
FIG. 8 is a view showing an example of Split PDCP layer user plane in MN and SN.

In this solution, the SN and MN both have a PDCP termination point. This means that the PDCP layer is split between the SN and MN in such a way that one terminates the encryption and the other terminates the integrity protection. As shown in FIG. 2 and FIG. 3, the sending entity in PDCP first applies integrity protection and then applies confidentiality protection, and the receiving entity first decrypts and then verifies the integrity protection. FIG. 8 shows the split PDCP protocol stack for this solution variant, where PDCP is separated into a PDCP-C (PDCP-Ciphering) and PDCP-I (PDCP-Integrity) layer. FIG. 8 also shows two nodes (node 1 and node 2). For example, in this solution variant, node 1 is the eNB and the node 2 is the gNB). Node 2 supports integrity protection, and node 1 supports the confidentiality protection. The PDCP-I therefore terminates in Node 2, whereas PDCP-C terminates in node 1.

This way, this solution variant makes it possible to distribute DRBs for PDU session across MN and SN equally. In other words, the MN can determine whether to offload DRB(s) to SN or not without being constrained with whether integrity protection is possible at the SN or not.

In order to do integrity protection and confidentiality protection at two nodes simultaneously, a UE would have to have two sets of keys (Kupint, Kupenc) for user plane protection on the access network. Of each set, one key is meant for doing integrity protection and the other key is meant for confidentiality protection. Each set of keys would have to be associated with one node, either the MN or the SN, or the gNB and eNB in case of MR-DC. In order to split the PDCP layer, this set of keys would have to be expanded because integrity protection and confidentiality protection are terminated at different NBs for one of the legs of the dual connectivity. As such, the key sets that the UE would hold, will be as follows:

Set 1: $K_{UPenc}$ for confidentiality protection in the PDCP layer between the UE and the Node 1 (for example, the eNB). This is represented as PDCP-C in FIG. 8.

Set 2: $K_{UPint}$ for integrity protection in the PDCP layer between the UE and the Node 2 (for example, the gNB). This is represented as PDCP-I in FIG. 8.

Figure 9:
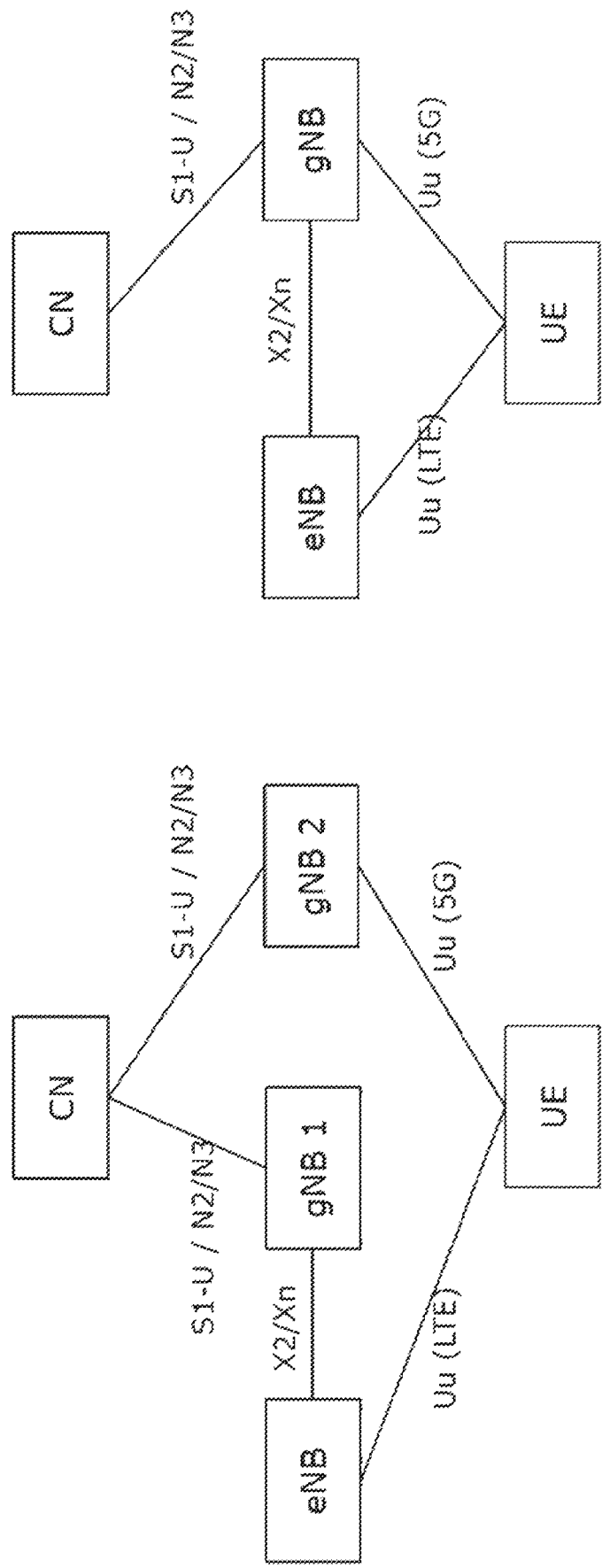
FIG. 9 shows an example of the architectures where the split PDCP can be applied.

Set 3: $K_{UPenc}$ and $K_{UPint}$ for confidentiality and integrity protection between the UE and Node 3 (which can be the same as Node 2, but can also be another gNB), for example FIG. 9 shows the possible architectures where the split PDCP can be applied. On the left, there are three nodes: Node 1 being an eNB, node 2 being a gNB1 and Node 3 being another gNB2. On the right, there are two nodes: Node 1 being an eNB and Node2 and Node 3 being the same gNB.

Figure 10:
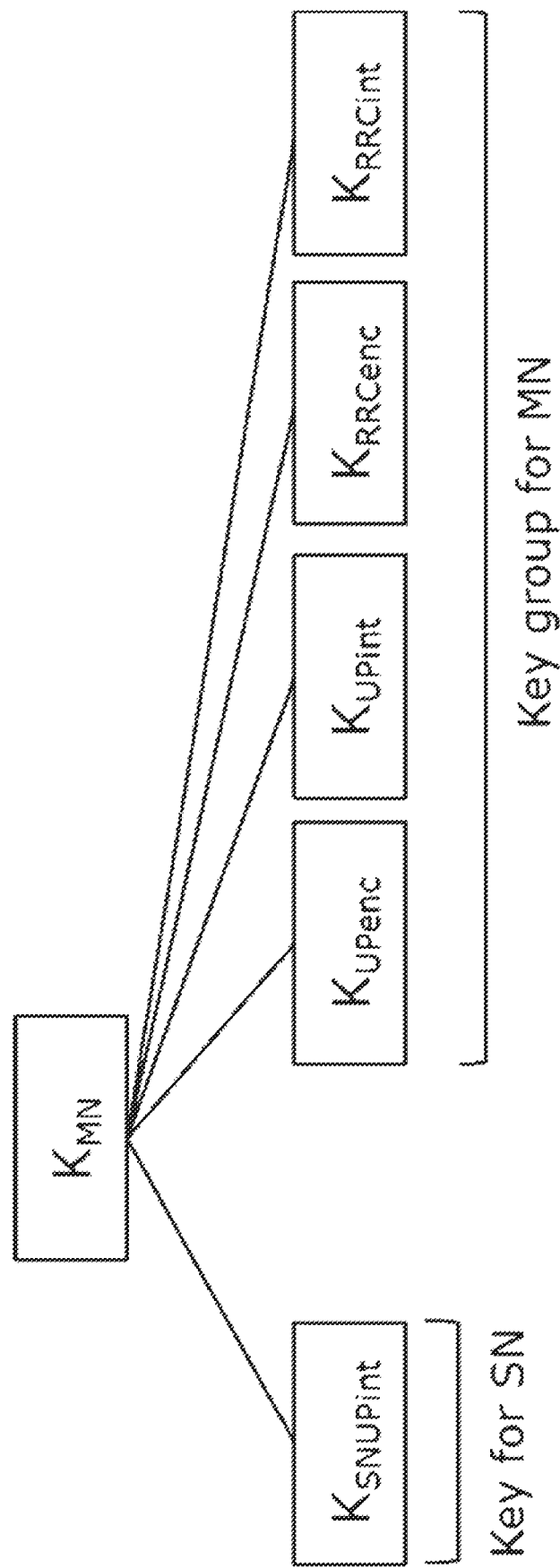
FIG. 10 shows an exemplary key hierarchy for split CDDP.

FIG. 10 shows an exemplary key hierarchy for split PDCP described in this solution variant. It should be noted that Node 2 and Node 3 are collapsed into one Node in this example. $K_{MN}$ and $K_{SN}$ represent either the eNB level key ($K_{eNB}$) as described in TS 33.401 [2], or gNB level key ($K_{gNB}$) as described in TS 33.501 [3]. Depending on the MR-DC scenario, the MN or SN is either eNB or gNB as described earlier in this disclosure. Either case, the key $K_{MN}$ represents the top level key at the MN, and $K_{SN}$ represents the top level key at the SN. In FIG. 10, the case of gNB being MN is displayed. In case the gNB is the SN, the top level key would be $K_{SN}$, but no further changes would be necessary to the key hierarchy.

Also, FIG. 10 does not display the keys kept at the eNB if the eNB is SN. In this case, the keys would be the RRC keys ($K_{RRCInt}$, $K_{RRCenc}$, $K_{UPenc}$, $K_{UPint}$). The $K_{UPint}$, however, is not used at the eNB.

When a bearer is created between the SN and the UE due to bearer offload from the MN, the MN derives a $K_{SN}$ from $K_{MN}$ for the SN. Then the SN further derives its own keys, for example, the confidentiality key ($K_{RRCenc}$) and integrity protection key ($K_{RRCint}$) for RRC and the encryption key for the user plane ($K_{UPenc}$). In order to facilitate the split PDCP layer, the MN will also have to derive a key $K_{UPSN\_Int}$, for example, using the formula:

$$K_{SNUPint} = KDF(K_{MN}, Counter, \text{"UP\_INT"}),$$

Figure 11:
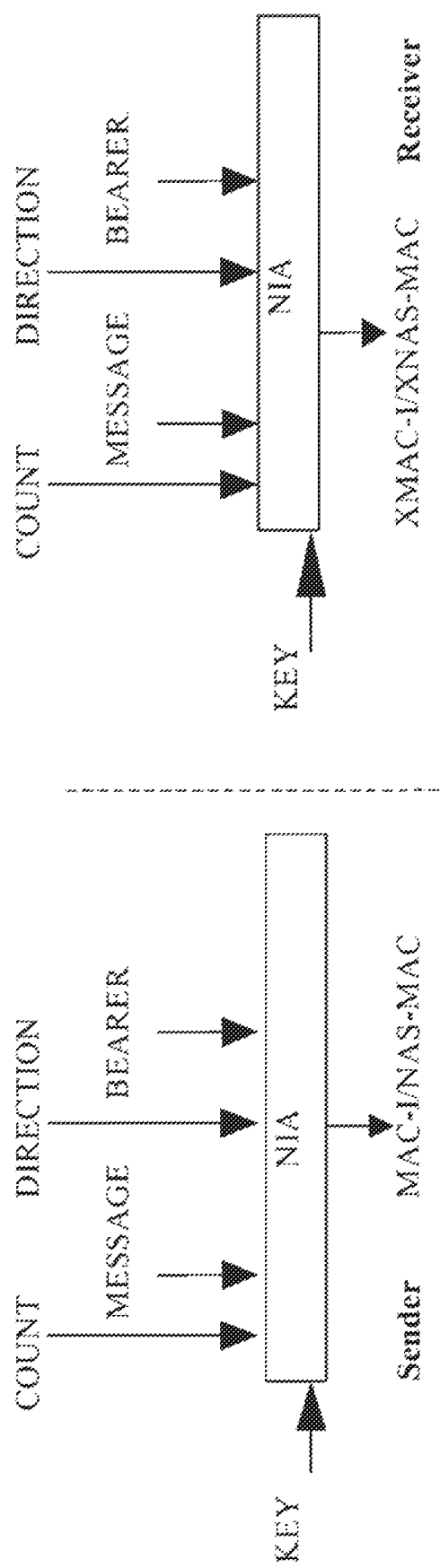
FIG. 11 shows an example of deviation of MAC I/NAS MAC.

This key is used in the integrity protection algorithm between the UE and the MN as KEY according to FIG. 11 (D.3.1.1-1 in TS 33.501 [3]).

The count is set to the packet count. The direction is set to 0 or 1 depending on whether the data is going to or from the UE and the bearer ID is set equal to the bearer ID of the bearer between the UE and the Node2. For the UE sending a PDCP packet to the Node2 via the Node1, this system works as follows:

1. The PDCP layer receives the IP packet from the upper layer, compresses the IP header and adds the PDCP header with the number or count;

2. Next, the UE calculates the MAC-I for the PDCP-I part of the PDCP layer as follows:
A) Uses KEY=$K_{SNUP\_int}$
B) Sets COUNT=packet count in the PDCP header
C) Sets the direction bit to 0
D) Sets the bearer ID to the ID of the bearer between the UE and the Node2
E) Inputs the message and calculates the MAC-I 3. The UE appends the MAC-I to the PDCP packet and encrypts the PDCP payload, including the MAC-I as follows:
A) Uses KEY=$K_{UPenc}$ associated with the Node1
B) Sets COUNT=packet count in the PDCP header
C) Sets the direction bit to 0
D) Sets the bearer ID equal to the bearer ID between the UE and the Node1
E) Encrypts the message using the resulting key stream.

Node1 that receives the packet does the following:
1. Reads the header and decrypts the message as follows;
A) Uses KEY=$K_{UP\_int}$ associated with the UE
B) Sets COUNT=packet count in the PDCP header
C) Sets the direction bit to 0
D) Sets the bearer ID to the ID of the bearer between the UE and the SN
E) Decrypts the PDCP layer using the resulting keystream.

2. Sends the decrypted PDCP packet to the Node2 for further handling over the X2 or Xn connection.

The Node2 that receives the packet does the following:
1. The Node2 removes the MAC-I from the packet and stores it temporarily. Then it calculates the expected MAC-I as follows:
A) Uses KEY=$K_{SNUP\_int}$ associated with the UE
B) Sets COUNT=packet count in the PDCP header
C) Sets the direction bit to 0
D) Sets the bearer ID to the ID of the bearer between the UE and the Node1
E) Inputs the message and calculates the expected MAC-I 2. If correct, the Node2 removes the PDCP headers, reconstructs the IP packet and forwards the packet over GTP-U. If incorrect, the Node2 sends a control packet to the UE, via the Node1 indicating that the integrity protection failed. The Node2 may also silently discard the packet.

Conversely for a downstream packet, the following steps will be performed:

1. The Node2 receives a DL packet from the CN and decides that it has to go via the Node1. It forwards it to the PDCP-I layer at the Node2. The PDCP-I layer receives the IP packet from the upper layer, compresses the IP header and adds the PDCP header with the number or count;

1. Then it calculates the MAC-I as follows:
A) Uses KEY=$K_{SNUP\_int}$ associated with the UE
B) Sets COUNT=packet count in the PDCP header
C) Sets the direction bit to 1

D) Sets the bearer ID to the ID of the bearer between the UE and the Node1

E) Inputs the message and calculates the expected MAC-I

3. And forwards the packet to the Node1

The Node1 that receives the packet does the following:

1. Reads the header and encrypts the message as follows;

A) Uses KEY=$K_{UP\_int}$ associated with the UE

B) Sets COUNT=packet count in the PDCP header

C) Sets the direction bit to 1

D) Sets the bearer ID to the ID of the bearer between the UE and the Node1

E) Encrypts the PDCP layer using the resulting keystream.

2. Sends the encrypted PDCP packet to the UE over the Uu interface.

The UE that receives the packet does the following:

1. The UE inspects the PDCP header and decrypts the PDCP payload, including the MAC-I as follows:

A) Uses KEY=$K_{UPenc}$ associated with the SN

B) Sets COUNT=packet count in the PDCP header

C) Sets the direction bit to 1

D) Sets the bearer ID equal to the bearer ID between the UE and the Node1

E) Decrypts the message using the resulting key stream.

1. Next, the UE removes the MAC-I, stores it temporarily and calculates the expected MAC-I for the PDCP-I part of the PDCP layer as follows:

A) Uses KEY=$K_{SNUP\_int}$

B) Sets COUNT=packet count in the PDCP header

C) Sets the direction bit to 1

D) Sets the bearer ID to the ID of the bearer between the UE and the Node1

E) Inputs the message and calculates the expected MAC-I

3. If the expected MAC-I and the MAC-I are the same, the PDCP layer reconstructs the IP packet and sends it to the higher layer.

Procedure for Setting Up the Bearers

Figure 12:
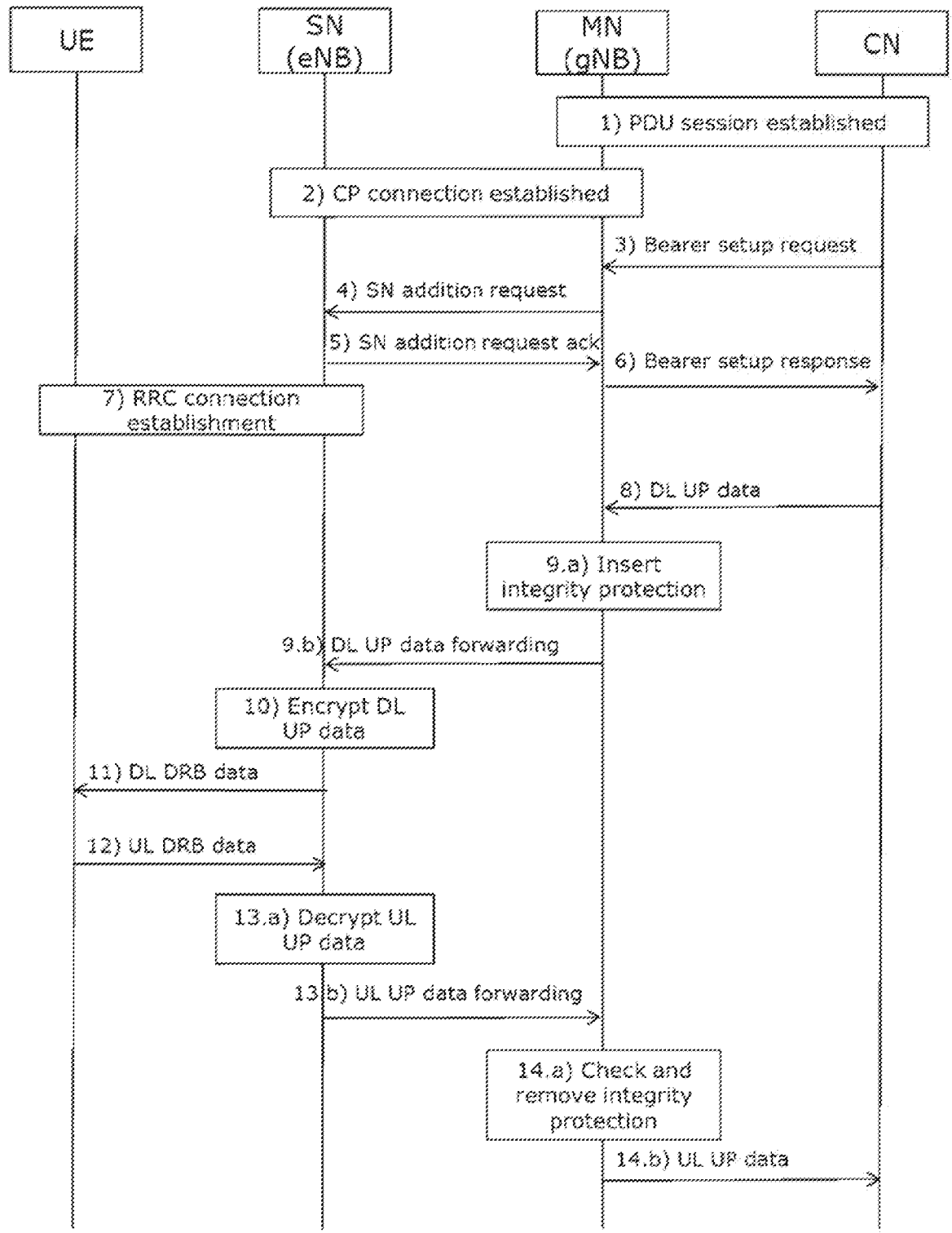
FIG. 12 is a sequence diagram showing an example of message flow in EN DC and NGEN DC scenarios.

If the MN is gNB the MN (gNB) accepts all DRB set up requests from the CN. Upon accepting the new DRB assignment, the MN requests the forwarding of DRB to the SN (eNB). At this time, the MN (gNB) requests the SN (eNB) to only apply UP confidentiality protection. The integrity protection will still be applied by the MN (gNB). This way, even though the DRB uses the LTE-Uu interface, which does not support UP IP, UP IP is supported by the MN (gNB) by routing the DRB traffic in both UL and DL directions. The exemplary procedure is illustrated in FIG. 12.

It should be noted that the message names shown in this figure are for illustration purpose only—they may be replaced by the standard-defined messages in the corresponding 3GPP specifications and may map to 4G or 5G specification message names.

1. The CN and the MN (gNB) establish a PDU session.

2. The MN (gNB) and the SN (eNB) establish a CP connection.

3. The CN initiates the establishment of a new bearer to the MN (gNB) by sending a Bearer Setup Request message, for example.

4. The MN (gNB) requests the SN (eNB) to add a new bearer to route the newly requested bearer. At this time, the MN (gNB) requests the SN (eNB) to apply confidentiality protection only over the LTE Uu interface by sending a SN Addition Request message, for example.

5. The SN (eNB) accepts the new bearer from the MN (gNB) by sending a SN addition Request Acknowledgement message, for example.

6. The MN (gNB) responds to the CN with successful establishment of a new bearer by sending a Bearer Setup Response message, for example.

7. The SN (eNB) and the UE establish RRC connection (if not already established).

8. The CN sends DL UP data to the MN (gNB).

9. The MN (gNB) subsequently adds the integrity protection to the DL UP data and forwards the integrity protected PDCP packet to the SN (eNB).

10. The SN (eNB) applies the confidentiality protection (encryption) to the DL DRB payload.

11. The SN (eNB) sends the DL DRB to the UE over LTE Uu interface.

12. The UE sends UL DRB with UP IP to the SN (eNB) over LTE Uu interface.

13. The SN (eNB) decrypts the UL DRB packet and forwards to the MN (gNB).

14. The MN (gNB) checks the validity of the UP IP, and if the integrity protection check is successful, the MN (gNB) removes the integrity protection and forwards the UL packet to the CN.

Solution 2, Description—IPsec Over 3GPP Access

Solution 2, Variant 1—IPsec Over 3GPP Over eNB Uu Only

In this solution variant, when a DRB is established at the eNB, IPsec tunnel is established between the UE and the network to protect the UP traffic. Because the IPsec includes integrity protection, the UP IP is covered over the 4G Uu interface even though the 4G Uu interface itself does not support UP IP.

This solution variant is applicable to the following cases:

In EN-DC and NGEN-DC scenarios, the DRB is assigned as the MCG bearer (eNB).

In NE-DC scenario, the DRB is offloaded as the SCG bearer (eNB).

Similar to solution 1, the SRB assignment is done to the MN irrespective of the scenario:

Assigned to eNB if it is a MN (EN-DC and NGEN-DC scenarios)

Assigned to gNB if it is a MN (NE-DC scenario)

Figure 13:
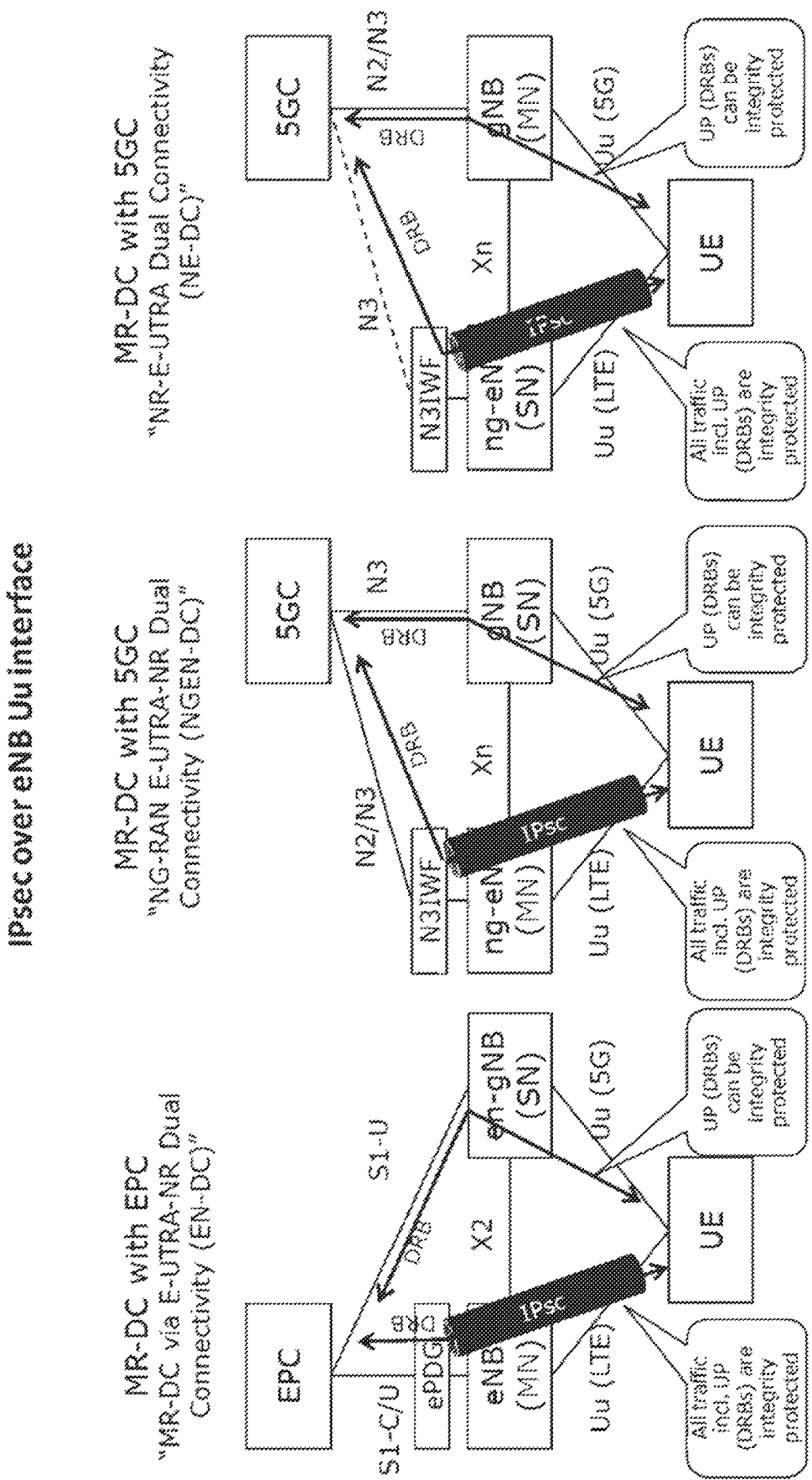
FIG. 13 shows an example of IPsec over eNB Uu interface.

FIG. 13 illustrates this solution variant in all 3 scenarios.

Figure 14:
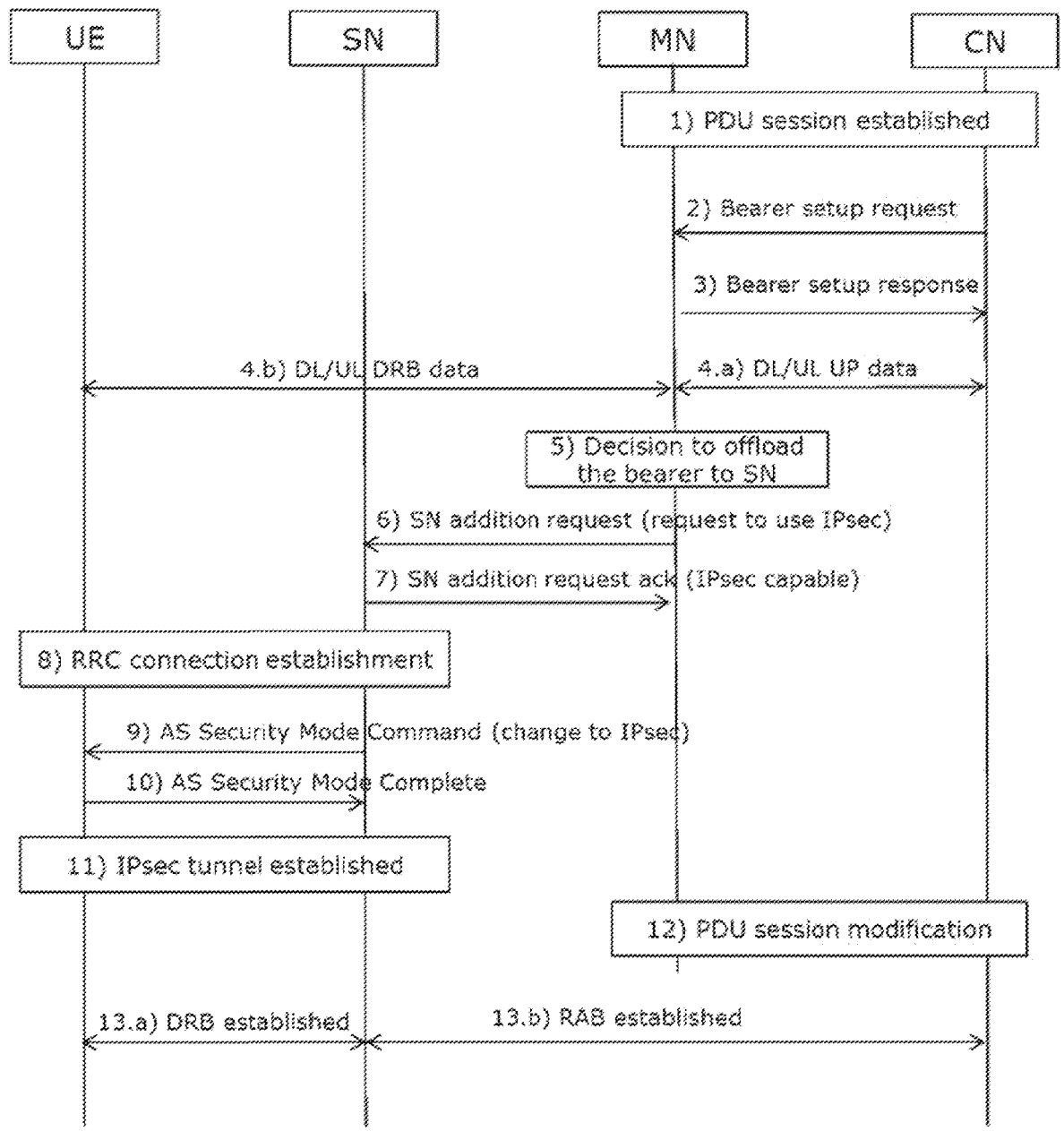
FIG. 14 is a sequence diagram showing an example of message flow in NE DC scenario.

In this solution variant, if the MN is the gNB (NE-DC scenario), the MN (gNB) accepts the DRB set up request from the CN and allocates the corresponding DRB to itself. Sometime later on, the MN (gNB) decides to offload this bearer to the SN (eNB). At this time, the UE and the SN (eNB) establishes IPsec tunnel. With the use of IPsec tunnel, the UP IP is covered for the 4G Uu interface between the UE and the SN (eNB). The exemplary procedure is illustrated in FIG. 14. Alternatively, IPsec tunnel may be established between the UE and the CN entity—in this case, one possible way is to reuse the existing solution for untrusted non-3GPP access by establishing the IPsec tunnel between the UE and the ePDG (in case of 4G CN, e.g. for EN-DC scenario) and between the UE and the N3IWF (in case of 5GC, e.g. NGEN-DC and NE-DC scenarios). Note that FIG. 14 shows the case where the IPsec tunnel is established between the UE and the (R)AN node (SN). Figure for the latter case is not shown.

It should be noted that the message names shown in these figures are for illustration purpose only—they may be replaced by the standard-defined messages in the corresponding 3GPP specifications and may map to 4G or 5G specification message names.

1. The CN and the MN establish PDU session.

2. The CN initiates the establishment of a new bearer to the MN (gNB) by sending Bearer Setup Request message, for example.

3. The MN (gNB) responds to the CN with successful establishment of a new bearer by sending Bearer Setup Response message, for example.

4. The UE and the CN establish a new bearer.

5. The MN (gNB) decides to offload this bearer to the SN (eNB).

6. The MN (gNB) requests the SN (eNB) to add a new bearer to offload the bearer by sending SN Addition Request message, for example. At this time, the MN (gNB) queries the SN (eNB) if it supports the IPsec tunnel based integrity protection for AS or not.

7. The SN (eNB) accepts the new bearer from the MN (gNB) by sending SN Addition Request acknowledgement message, for example. At this time, the SN (eNB) responds to the MN (gNB) that the SN supports the IPsec tunnel based integrity protection for AS.

8. The SN (eNB) and the UE establishes RRC connection (if not already established).

9. The SN (eNB) instructs the UE to establish the IPsec tunnel based integrity protection for AS by sending AS Security Mode Command (AS SMC), for example.

10. The UE replies to the SN (eNB) to indicate that the UE acknowledges the request and switches to the IPsec tunnel based integrity protection for AS by sending AS Security Mode Complete message, for example. It should be noted that, at this time, the SN (eNB) does not use integrity protection at the PDCP layer on 4G Uu interface.

11. The UE and the SN (eNB) establishes IPsec tunnel. This IPsec tunnel establishment effectively starts the integrity protection in the 4G Uu interface at the IPsec layer. Alternatively, IPsec tunnel may be established between the UE and the CN entity—the ePDG (in case of 4G CN, e.g. for EN-DC scenario) and between the UE and the N3IWF (in case of 5GC, e.g. NGEN-DC and NE-DC scenarios). Note that FIG. 14 above shows the case where the IPsec tunnel is established between the UE and the (R)AN node (SN). Figure for the latter case is not shown.

12. The MN (gNB) indicates to the CN that this bearer is terminated at the SN (eNB) by sending PDU Session Modification message, for example.

13. The UE and the CN completes the bearer establishment for both UL and DL bearer traffic over IPsec tunnel through the SN (eNB) with integrity protection of the 4G Uu interface being provided by the IPsec layer.

In the above description, it is assumed that confidentiality protection (encryption) remains on the PDCP layer in the 4G Uu interface. However, this may also be moved to the IPsec layer due to the IPsec tunnel establishment in the 4G Uu interface. In this case, PDCP changes to null encryption, and the AS SMC messages in step 9 and 10 in the above figure includes the request and confirmation to change both confidentiality protection and integrity protection to the IPsec layer.

Figure 15:
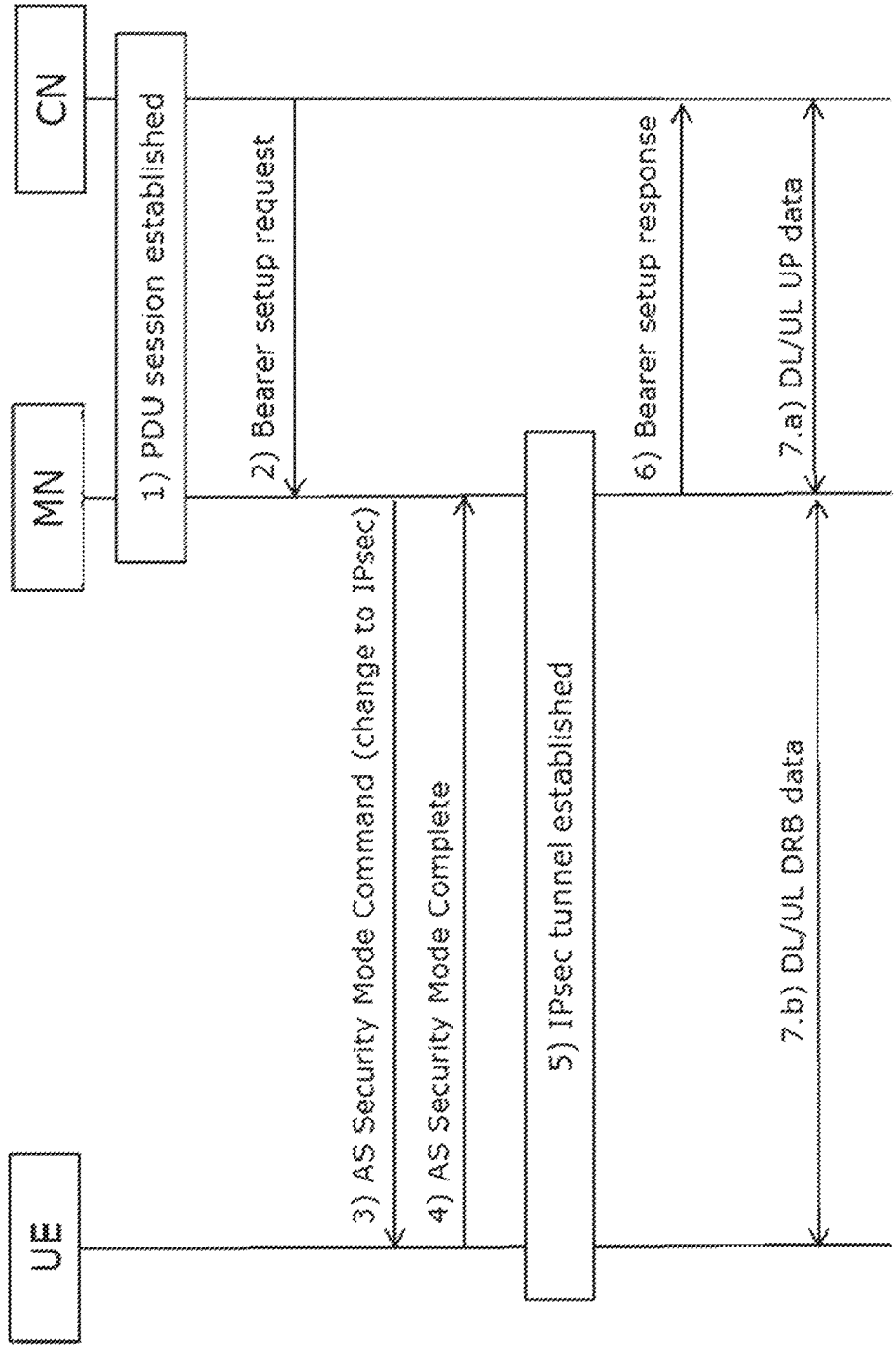
FIG. 15 is a sequence diagram showing an example of message flow in EN DC and NGEN DC scenarios.

On the other hand, if the MN is eNB (EN-DC or NGEN-DC scenarios), the MN (eNB) accepts the DRB set up request from the CN. Upon accepting the new DRB assignment, the UE and the MN (eNB) establishes IPsec tunnel. With the use of IPsec tunnel, the UP IP is covered for the 4G Uu interface between the UE and the MN (eNB). The exemplary procedure is illustrated in FIG. 15.

Alternatively, IPsec tunnel may be established between the UE and the CN entity—in this case, one possible way is to reuse the existing solution for untrusted non-3GPP access by establishing the IPsec tunnel between the UE and the ePDG (in case of 4G CN, e.g. for EN-DC scenario) and between the UE and the N3IWF (in case of 5GC, e.g. NGEN-DC and NE-DC scenarios). Note that FIG. 15 below shows the case where the IPsec tunnel is established between the UE and the (R)AN node (MN). Figure for the latter case is not shown.

It should be noted that the message names shown in these figures are for illustration purpose only—they may be replaced by the standard-defined messages in the corresponding 3GPP specifications and may map to 4G or 5G specification message names.

1. The CN and the MN (eNB) establish a PDU session.

2. The CN initiates the establishment of a new bearer to the MN (eNB) by sending Bearer Setup Request message, for example. In this particular case, the MN (eNB) indicates to the UE that the UE needs to establish an IPsec tunnel with the network in order to protect the 4G Uu interface, including UP IP.

3. The MN (eNB) instructs the UE to establish the IPsec tunnel based integrity protection for AS by sending AS Security Mode Command (AS SMC), for example.

4. The UE replies to the MN (eNB) to indicate that the UE acknowledges the request and switches to the IPsec tunnel based integrity protection for AS by sending AS Security Mode Complete message, for example. It should be noted that, at this time, the MN (eNB) does not use integrity protection at the PDCP layer on 4G Uu interface.

5. The UE and the MN (eNB) establishes IPsec tunnel. This IPsec tunnel establishment effectively starts the integrity protection in the 4G Uu interface at the IPsec layer. Alternatively, IPsec tunnel may be established between the UE and the CN entity—the ePDG (in case of 4G CN, e.g. for EN-DC scenario) and between the UE and the N3IWF (in case of 5GC, e.g. NGEN-DC and NE-DC scenarios). Note that FIG. 15 above shows the case where the IPsec tunnel is established between the UE and the (R)AN node (MN). Figure for the latter case is not shown.

6. The MN (eNB) responds to the CN with successful establishment of a new bearer by sending Bearer Setup Response message, for example.

7. The UE and the CN completes the bearer establishment for both UL and DL bearer traffic over IPsec tunnel through the MN (eNB) with integrity protection of the 4G Uu interface being provided by the IPsec layer.

In the above description, it is assumed that confidentiality protection (encryption) remains on the PDCP layer in the 4G Uu interface. However, this may also be moved to the IPsec layer due to the IPsec tunnel establishment in the 4G Uu interface. In this case, PDCP changes to null encryption, and the AS SMC messages in step 3 and 4 in the above figure includes the request and confirmation to change both confidentiality protection and integrity protection to the IPsec layer.

Solution 2, Variant 2—IPsec Over 3GPP Over eNB Uu and gNB Uu

In this solution variant, IPsec tunnel is applied to both 4G Uu and 5G Uu interfaces. Use of IPsec tunnel in both 4G and 5G Uu interfaces makes the whole security management simpler in such a way that the decision of whether to apply integrity protection or not on 4G Uu interface becomes unnecessary. This is significant because the existing 3GPP solution as described in TS 33.501 [3] explicitly handles the cases where the CN (SMF) specifies the UP security policy upon establishing PDU session with a UE, and one of the information defined in the UP security policy is the use of integrity protection is "required", "preferred", or "not needed". By applying IPsec tunnel in both 4G and 5G Uu interfaces as described in this solution variant, the decision in the CN to manage and control UP IP security policy becomes no longer necessary.

By using the IPsec tunnel over both 4G and 5G Uu interfaces, both confidentiality and integrity protection can be covered without further indication by the CN, thus can simply the CN interaction for managing the UP security policy.

Figure 16:
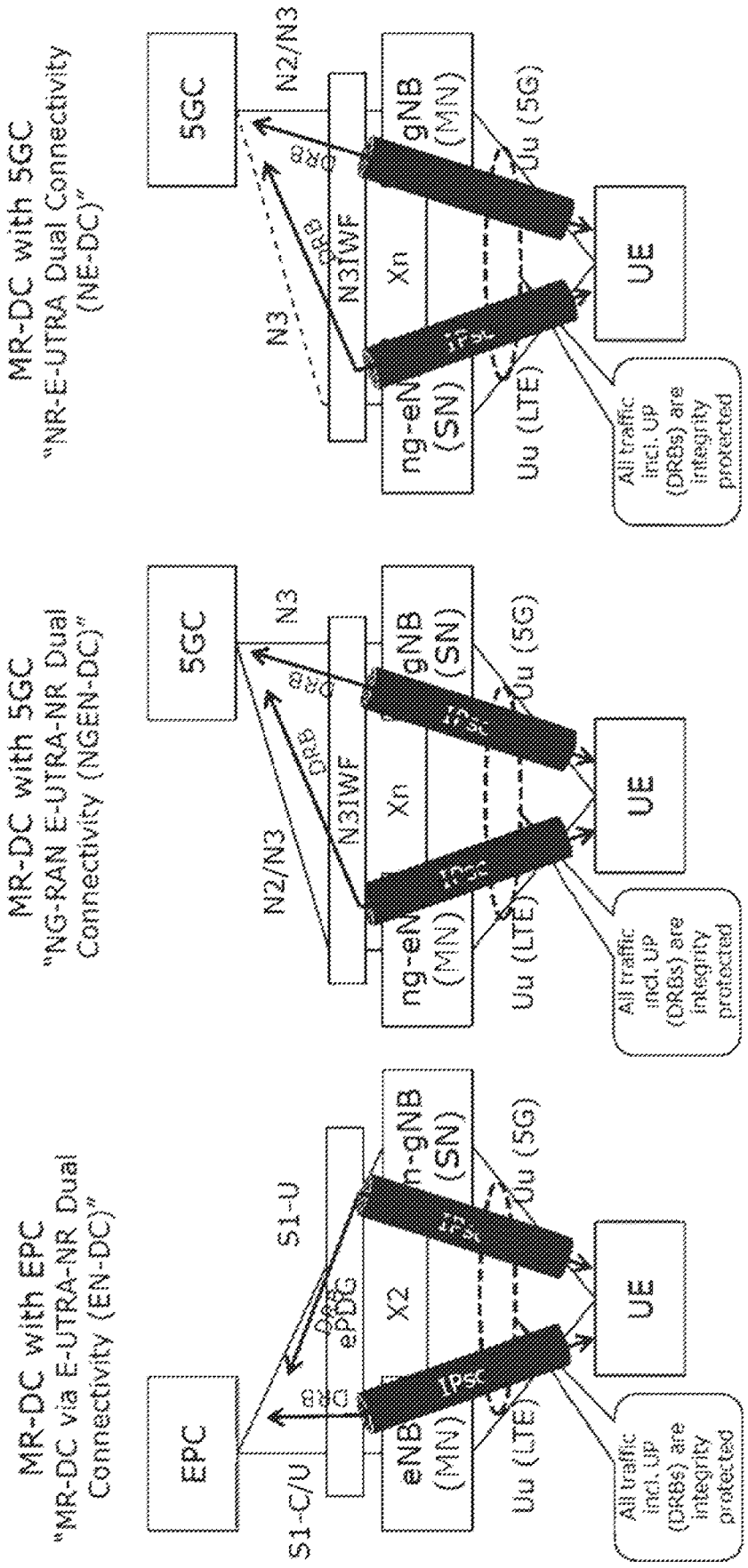
FIG. 16 shows an example of IPsec over both 4G Uu and 5G Uu interfaces.

The described mechanism is illustrated in FIG. 16.

In this solution variant, IPsec tunnels are established when the PDU session is established to the UE and any of the 3 scenarios of the MR-DC is used. The IPsec tunnel establishment to both 4G Uu and 5G Uu interfaces can be done at the same time in either order in any of the 3 scenarios (e.g. EN-DC, NGEN-DC, NE-DC). Therefore, the message flows are all similar. Therefore, it is not shown.

The FIG. 16 shows that the IPsec tunnel terminates in the N3IWF or ePDG. According to 3GPP specifications, these core network nodes are used in cases where the UE connects through a non-3GPP access such as WiFi. The ePDG and N3IWF are normally facing the internet. In this solution variant, the N3IWF and ePDG are facing a more trusted operator controlled 3GPP (R)AN. Therefore, it is expected that other existing nodes in the network could also be equipped with IPsec functionality. Examples include the Serving GW (S-GW) in 4G and the UPF in 5G. Alternatively, even existing security gateways setting at the edge between the core network and radio network could be used as an IPsec termination point, just as well as a newly dedicated User Plane Security Termination (UPST) node just dedicated for this purpose.

There can be multiple termination points where the encryption of the User Plane terminates. With respect to deploying IPsec, there are two options:

Option 1: IPsec does both integrity protection (encryption) and authentication or integrity protection. In this case, the termination point of the IPsec tunnel handles both of these functions. This would mean that the PDCP layer is set up without security functionalities (e.g. without confidentiality protection and integrity protection) because the IPsec layer covers them.

Option 2: IPsec does only integrity protection. In this case, the PDCP layer terminates the confidentiality protection, while the IPsec layer terminates the integrity protection with the UE.

Figure 17:
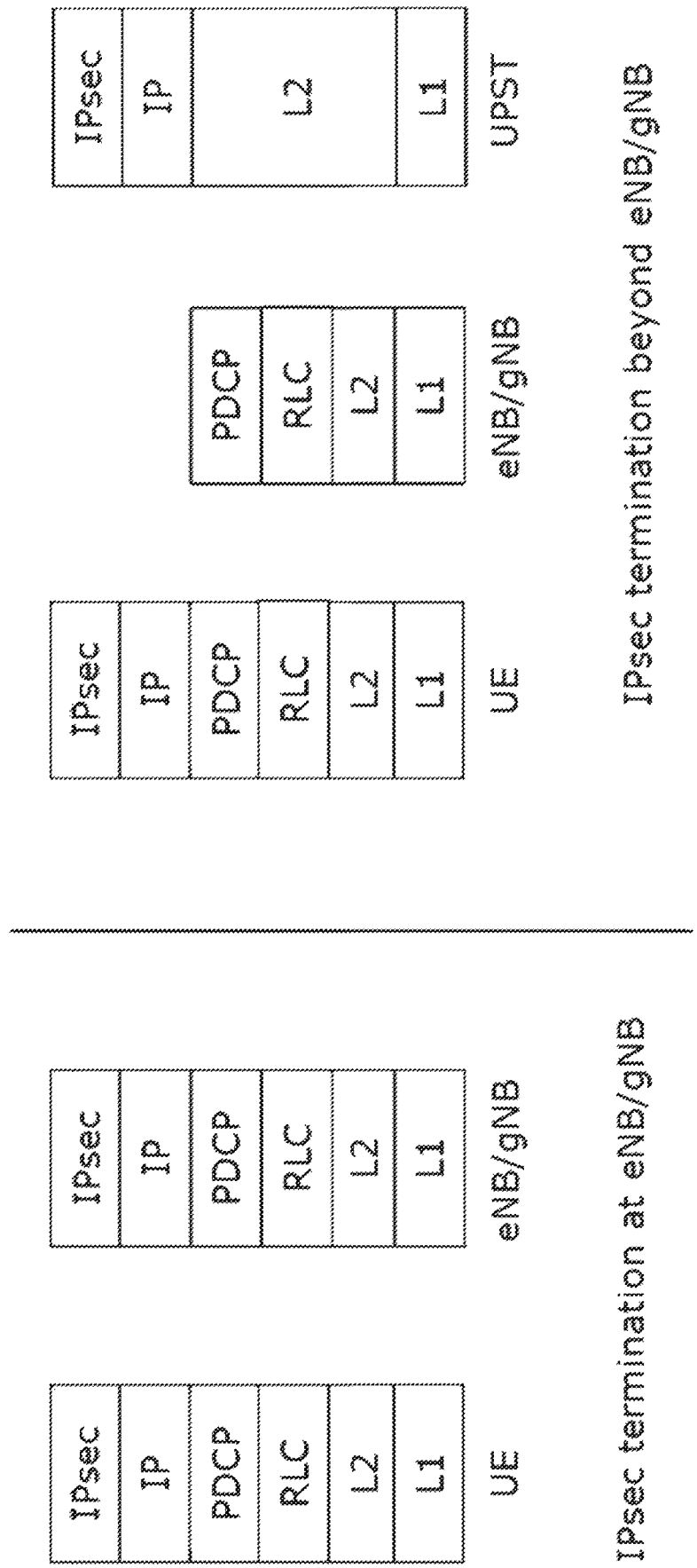
FIG. 17 shows an example of IPsec tunnel termination options.

FIG. 17 shows the protocol stack of a UE and the network, showing two possible termination points of UP IP: PDCP and IPsec. If the UP IP is terminated at the PDCP layer, it is terminated at the eNB/gNB as shown in both left and right hand side of the figure. On the other hand, if the UP IP is terminated at the IPsec layer, there can be possible choices of termination points—either at the eNB/gNB or at a network element beyond the eNB/gNB. On the left hand side of the figure, the IPsec termination point is located in the eNB/gNB. On the right hand side of the figure, the IPsec termination point is located in the network element beyond the eNB/gNB. Having the IPsec termination point beyond the eNB/gNB is advantageous in MR-DC scenarios because the use of IPsec tunnel can be technology independent. In other words, a single IPsec tunnel between the UE and the network element beyond eNB/gNB can be used to protect the UP traffic irrespective of whether the UP traffic goes over 4G Uu or 5G Uu interface. This section describes this solution variant further.

Figure 18:
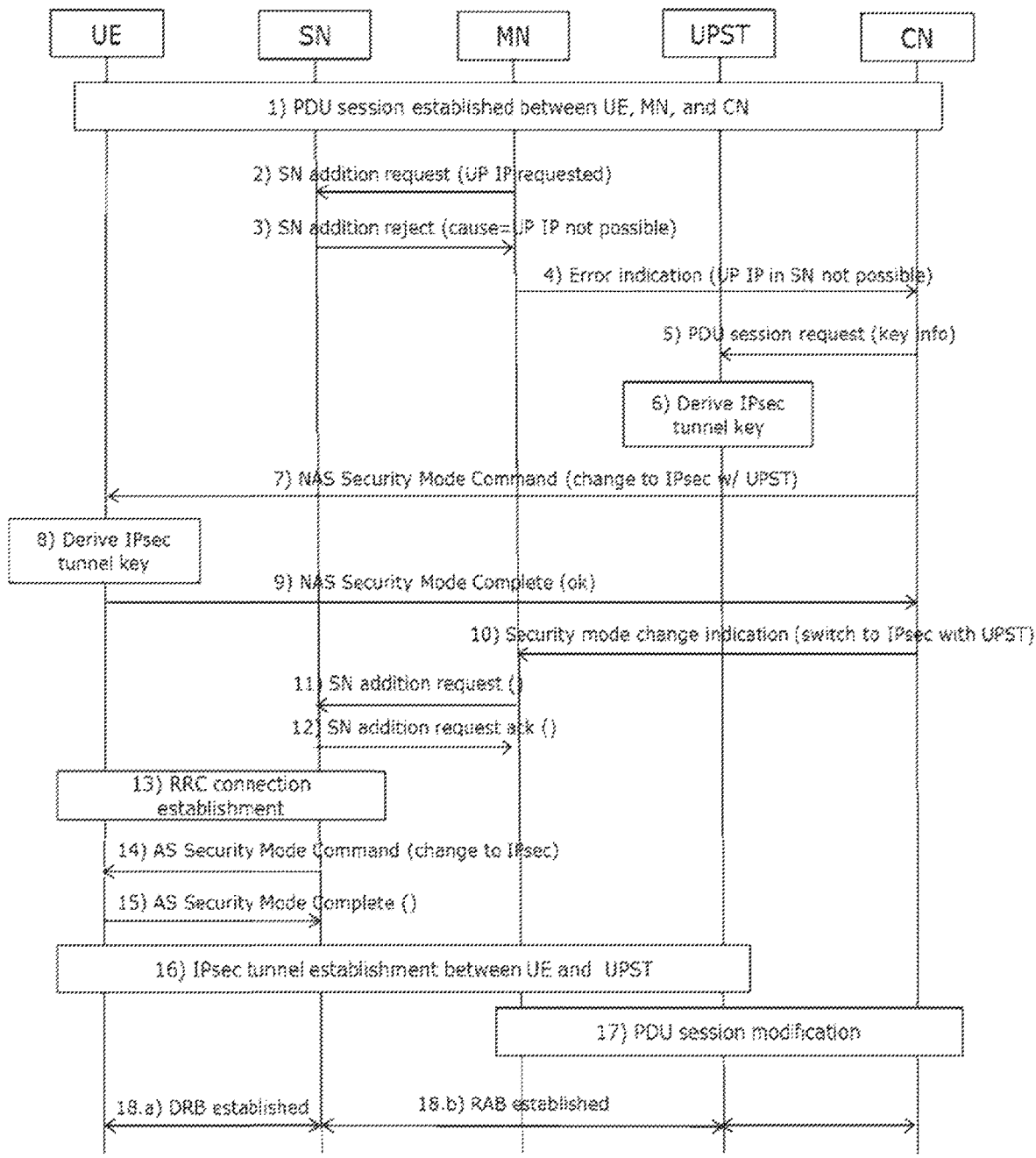
FIG. 18 is a sequence diagram showing an example of IPsec tunnel termination procedure.

FIG. 18 shows a flow diagram for setting up the security context between the termination points of the IPsec in the core network (called User Plane Security Termination Point, UPTP). It is assumed that the UE is initially only connected to the MN in single connectivity mode and that the MN and the SN have setup a CP already. Also, it is assume that user data is already going from the UE to the CN via the MN. It should be noted that, depending on the MR-DC scenarios, MN and SN can be either eNB or gNB. However, it is not significant in this solution variant. Therefore, the description in this solution variant is kept as generic, and MN and SN are discussed as their functional entity in MR-DC, not necessarily concerned with whether they are eNB or gNB.

In the first step, the MN sends a request to add a SN with integrity protection to the SN. The SN receives the request and takes a decision whether IP can or cannot be provided. If IP can be provided, the request continues as is. If not (this is the case shown in the figure), the SN will decline the request saying that no IP can be provided.

Upon reception of the message that the SN declines to provide integrity protection, the MN will decide to switch over to the UPST for IP only. In order to do so, the MN indicates this condition to the CN by sending Error Indication message to the CN, for example. The CN derives the IPsec key to the UPST and provides this key together with the bearer ID to the UPST. Next the CN sends a user plane NAS Security Mode Command (NAS SMC) message for UP integrity ONLY to the UE. The UE derives the same key for IPsec tunnel and responds with NAS Security Mode Complete (NAS SMC) message to the CN. Then, the CN informs the MN that the UE has acknowledged the use of the UPST and that the IP can be removed from the user plane between the MN and the UE.

The MN will subsequently send AS Security Mode Command (AS SMC) message to the UE, instructing it to remove the IP from the PDCP layer and switch over to the UPST. Upon reception of this message, the UE will stop applying IP on the PDCP layer and start using IP on the IPsec layer instead. The UE will respond with AS Security Mode Complete (AS SMC) message after which the MN will stop using integrity protection on the PDCP layer in the Uu interface.

Next, the MN can start the DC mode procedures again. This time no IP needs to be requested. Upon receiving this request, the SN establishes a bearer resource for the UE.

It should be noted that the message names shown in these figures are for illustration purpose only—they may be replaced by the standard-defined messages in the corresponding 3GPP specifications and may map to 4G or 5G specification message names.

1. PDU session is setup between the UE, MN, and CN.

2. The MN determines to offload the bearer and request the SN by sending SN Addition Request message, for example. At this time, the MN indicates the SN to use IPsec tunnel to support integrity protection to this bearer.

3. The SN determines that it is either: 1) not able to support IPsec tunnel based integrity protection for AS, or 2) determine not to use that functionality, and indicate this information to the MN by sending SN Addition Reject message, for example.

4. The MN indicates to the CN that the IPsec tunnel based integrity protection for AS at the SN is not possible by sending an Indication message, for example.

5. The CN requests the UPST to establish IPsec tunnel on behalf of the SN, by sending PDU Session Request message, for example. At this time, the CN derives a key and provides it to the UPST along with bearer ID. This key is used by the UE and the UPST to establish IPsec tunnel.

Alternative to steps 2 through 5 above, the MN may alternatively request IPsec tunnel establishment to the UPST based on other decision criteria, such as system configuration or operator preference.

6. UPST derives the IPsec tunnel key using the information received in step 6.

7. The CN instructs the UE to establish the IPsec tunnel based integrity protection for AS by sending NAS Security Mode Command (NAS SMC), for example. At this time, the CN indicates to the UE to establish IPsec tunnel with UPST.

8. The UE derives the IPsec tunnel key using the information received in step 8.

9. The UE acknowledge the request to establish IPsec tunnel by sending NAS Security Mode Complete message, for example.

10. The CN indicates to the MN that the bearer offload to the SN needs to be done by using IPsec tunnel between the CN and the UPST by sending Security Mode Change Indication message, for example.

11. The MN decides to offload the bearer and requests the SN by sending SN Addition Request, for example. At this time, the MN request to use IPsec tunnel with UPST and turn off the UP IP in PDCP layer in the SN.

12. The SN acknowledges the offload of the bearer by sending SN Addition Request Acknowledge message, for example. At this time, the SN acknowledges that it needs to establish IPsec tunnel with the UPST and turn off the UP IP in PDCP layer in the SN.

13. The UE and the SN establishes RRC connection.

14. The SN requests the UE to turn off the UP IP in PDCP layer (if it is used) by sending AS Security Mode Command (AS SMC) message, for example, to the UE.

15. The UE replies to the SN to indicate that the UE acknowledges the request and switches to the IPsec tunnel based integrity protection for AS by sending AS Security Mode Complete message, for example.

16. The UE and the UPST establishes IPsec tunnel.

17. The MN indicates the CN that the bearer is now offloaded to the SN by sending PDU Session Modification message, for example.

18. Bearer path is established between CN, UPST, SN, and UE.

Solution 3, Description—RN Link

In this solution, the 4G Uu interface between the eNB and the UE is set up as a Relay Node (RN) link. Per the existing 4G (LTE) RRC specification in TS 36.331 [6], the RN link between the eNB and RN is required to support UP IP. In other words, by re-framing the normal 4G Uu interface between the eNB and the UE as if it is an RN link, this 4G Uu interface, by default, supports UP IP. By doing so, both 4G and 5G Uu interfaces are able to support UP IP. Therefore, it is possible to remove all constraints as described in the problem statement section surrounding the absence of integrity protection in 4G system.

Figure 19:
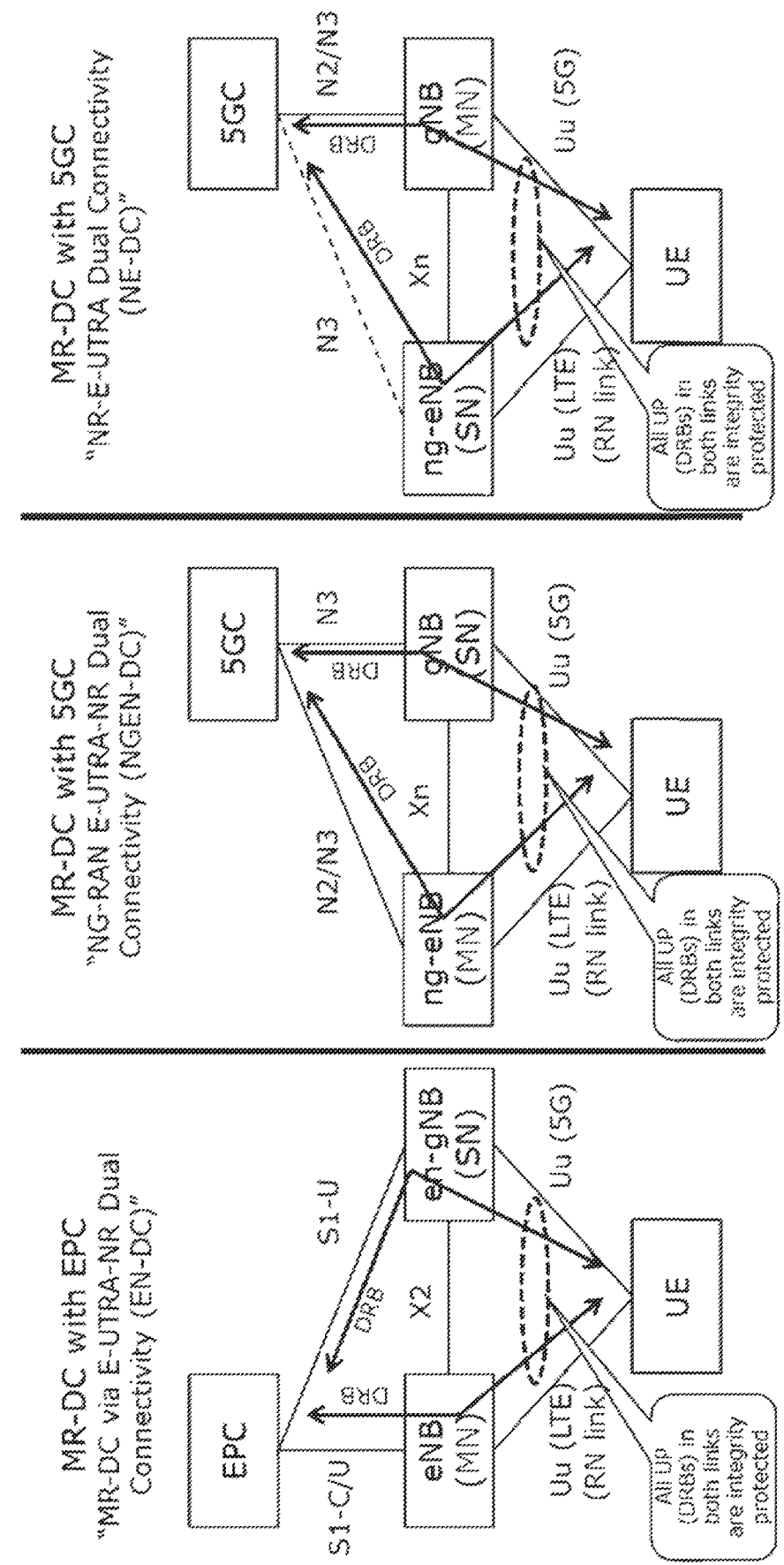
FIG. 19 is a view showing an example of 4G Uu interface as RN link.

The described solution is illustrated in FIG. 19.

Considering the normal 4G Uu interface as RN Uu interface requires changes in both eNB and the UE. Specifically:

The eNB needs to consider that it is connected to an RN over the Uu interface

The UE needs to consider itself as an RN to communicate with the eNB.

Solution 4, Description—Coordination of UP IP Between eNB and gNB

Figure 20:
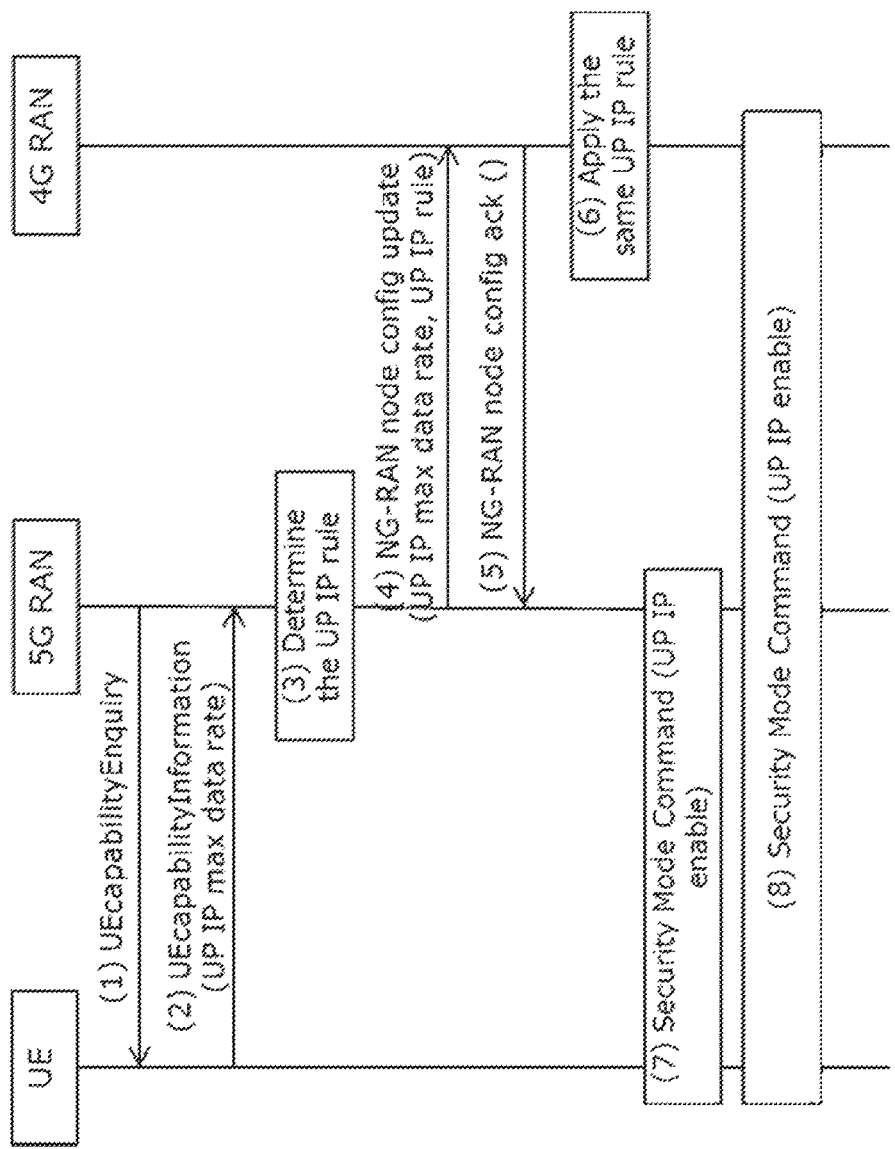
FIG. 20 is a sequence diagram showing an example of coordination between 4G(R)AN and 5G(R)AN nodes.

In this solution, a mechanism is described in which the 4G (R)AN node (eNB) and the 5G (R)AN node (gNB) communicates with each other to coordinate the security policy for the UE, including whether to apply UP IP for the DRB or not. The exemplary procedure is illustrated in FIG. 20.

This scheme is based on the premise that the 4G (R)AN (eNB) either: 1) supports UP IP to the UE over the 4G Uu interface, or 2) supports other mechanism that makes the individual application of UP IP unnecessary. This condition may be achieved by implementing functionality from several possible solutions, some of which are described in this disclosure.

1. Apply IPsec tunnel over 4G Uu interface (solution 2, both variants in the present disclosure).

2. Apply 4G Uu interface as RN link (solution 3 in the present disclosure).

3. 4G (R)AN node (eNB) is enhanced to support UP IP which is beyond the existing 3GPP specification in TS 36.323 [4].

It should be noted that the message names shown in these figures are for illustration purpose only—they may be replaced by the standard-defined messages in the corresponding 3GPP specifications and may map to 4G or 5G specification message names.

1. The 5G (R)AN node (gNB) queries the UE's UP IP capability (e.g. maximum data rate the UE supports the UP IP) by sending UE Capability Enquiry message, for example.

2. The UE provides the UP IP capability (e.g. maximum data rate the UE supports the UP IP) by sending UE Capability Information message, for example.

3. The 5G (R)AN node (gNB) determines whether to apply UP IP for the DRB or not.

4. The 5G (R)AN node (gNB) provides the 4G (R)AN node (eNB) with the UE's UP IP capability (e.g. maximum data rate the UE supports the UP IP) and gNB's decision on whether to apply UP IP for DRB or not by sending NG-RAN Node Configuration Update message, for example.

5. The 4G (R)AN node (eNB) acknowledges the received information to the 5G (R)AN node (gNB) by sending NG-RAN Node Configuration Acknowledge message, for example.

6. The 4G (R)AN node (eNB) applies the same UP IP rule with the UE.

7. The 5G (R)AN node (gNB) commands the UE whether to apply UP IP in the DRB or not by sending Security Mode Command message, for example.

8. The 4G (R)AN node (eNB) commands the UE whether to apply UP IP in the DRB or not by sending Security Mode Command message, for example.

System Overview

Figure 21:
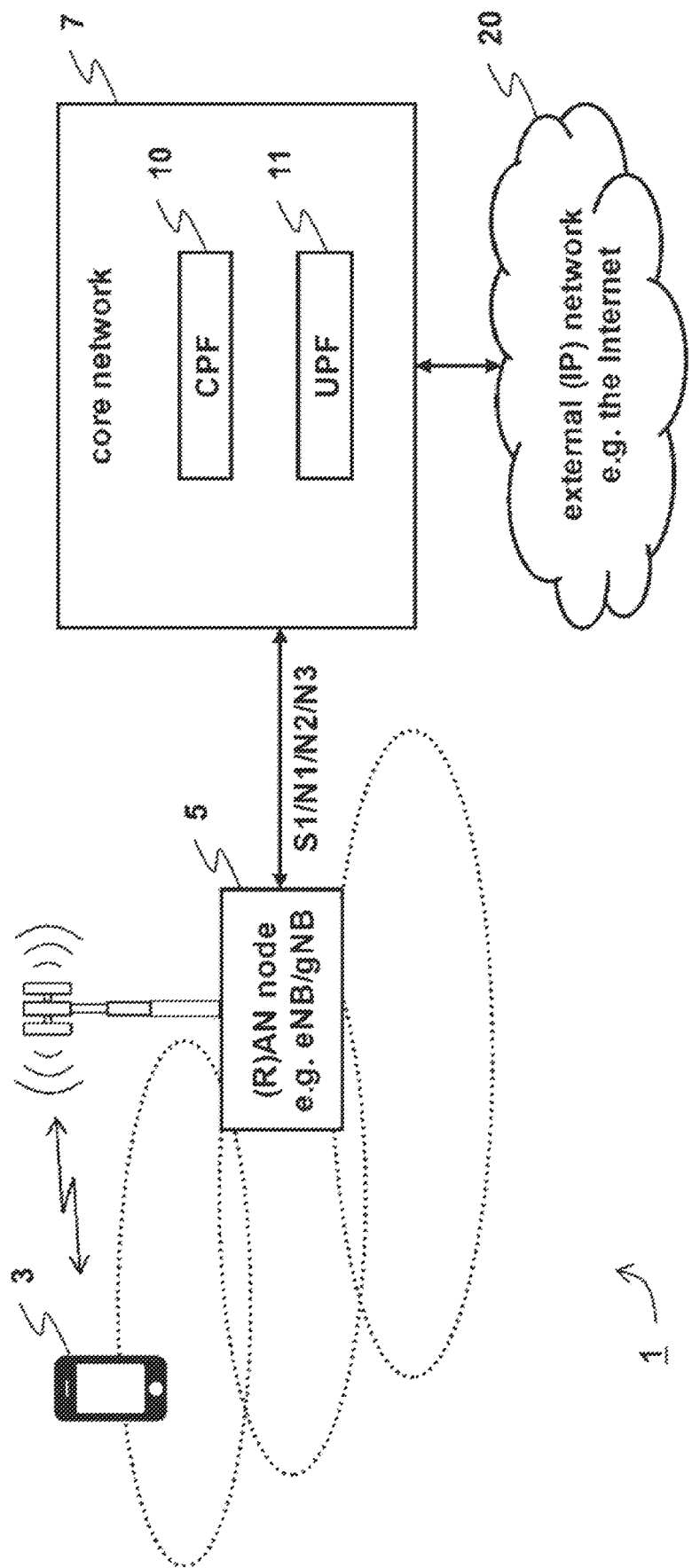
FIG. 21 is a view showing an example of the configuration of a mobile (cellular or wireless) telecommunication system.

FIG. 21 schematically illustrates a mobile (cellular or wireless) telecommunication system 1 to which the above embodiments ('solution variants') are applicable.

In this network, users of mobile devices 3 (UEs) can communicate with each other and other users via respective base stations 5 and a core network 7 using an appropriate 3GPP radio access technology (RAT), for example, an E-UTRA and/or 5G RAT. It will be appreciated that a number of base stations 5 form a (radio) access network or (R)AN. As those skilled in the art will appreciate, whilst one mobile device 3 and one base station 5 are shown in FIG. 21 for illustration purposes, the system, when implemented, will typically include other base stations and mobile devices (UEs).

Each base station 5 controls one or more associated cells (either directly or via other nodes such as home base stations, relays, remote radio heads, distributed units, and/or the like). A base station 5 that supports E-UTRA/4G protocols may be referred to as an 'eNB' and a base station 5 that supports NextGeneration/5G protocols may be referred to as a 'gNBs'. It will be appreciated that some base stations 5 may be configured to support both 4G and 5G, and/or any other 3GPP or non-3GPP communication protocols.

The mobile device 3 and its serving base station 5 are connected via an appropriate air interface (for example the so-called 'Uu' interface and/or the like). Neighbouring base stations 5 are connected to each other via an appropriate base station to base station interface (such as the so-called 'X2' interface, 'Xn' interface and/or the like). The base station 5 is also connected to the core network nodes via an appropriate interface (such as the so-called 'S1', 'N1', 'N2', 'N3' interface, and/or the like).

The core network 7 typically includes logical nodes (or 'functions') for supporting communication in the telecommunication system 1. Typically, for example, the core network 7 of a 'Next Generation'/5G system will include, amongst other functions, control plane functions (CPFs) 10 and user plane functions (UPFs) 11. From the core network 7, connection to an external IP network 20 (such as the Internet) is also provided.

The components of this system 1 are configured to perform the above described exemplary embodiments.

User Equipment (UE)

Figure 22:
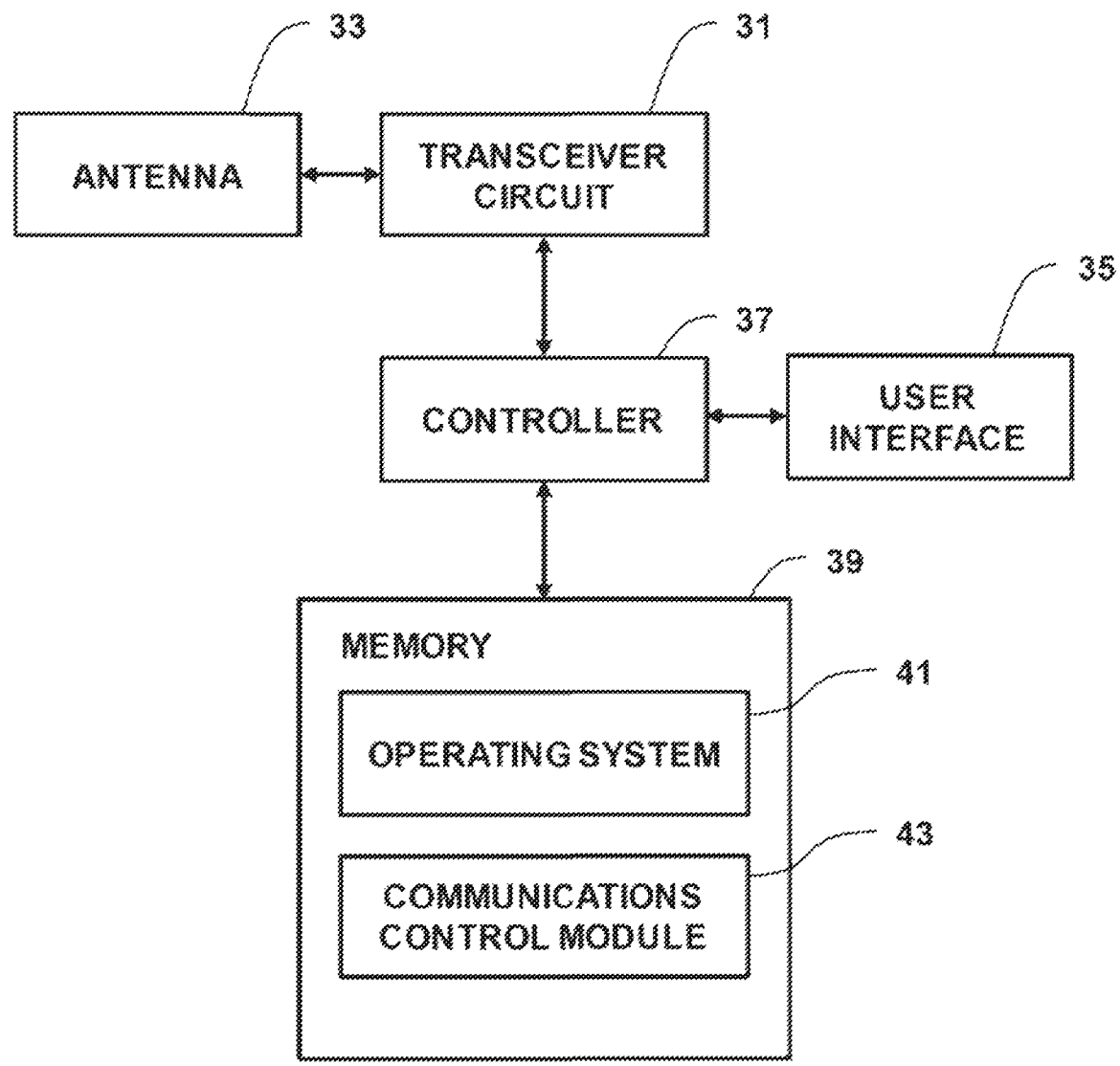
FIG. 22 is a block diagram showing an example of the configuration of a UE.

FIG. 22 is a block diagram illustrating, in more detail, the main components of the UE (mobile device 3) shown in FIG. 21. As shown, the UE 3 includes a transceiver circuit 31 which is operable to transmit signals to and to receive signals from the connected node(s) via one or more antenna 33. Although not necessarily shown, the UE will of course have all the usual functionality of a conventional mobile device (such as a user interface 35) and this may be provided by any one or any combination of hardware, software and firmware, as appropriate. A controller 37 controls the operation of the UE in accordance with software stored in a memory 39. The software may be pre-installed in the memory 39 and/or may be downloaded via the telecommunication network 1 or from a removable data storage device (RMD), for example. The software includes, among other things, an operating system 41 and a communications control module 43. The communications control module 43 is responsible for handling (generating/sending/receiving) signalling messages and uplink/downlink data packets between the UE 3 and other nodes, including (R)AN nodes 5 and core network nodes.

(R)AN Node

Figure 23:
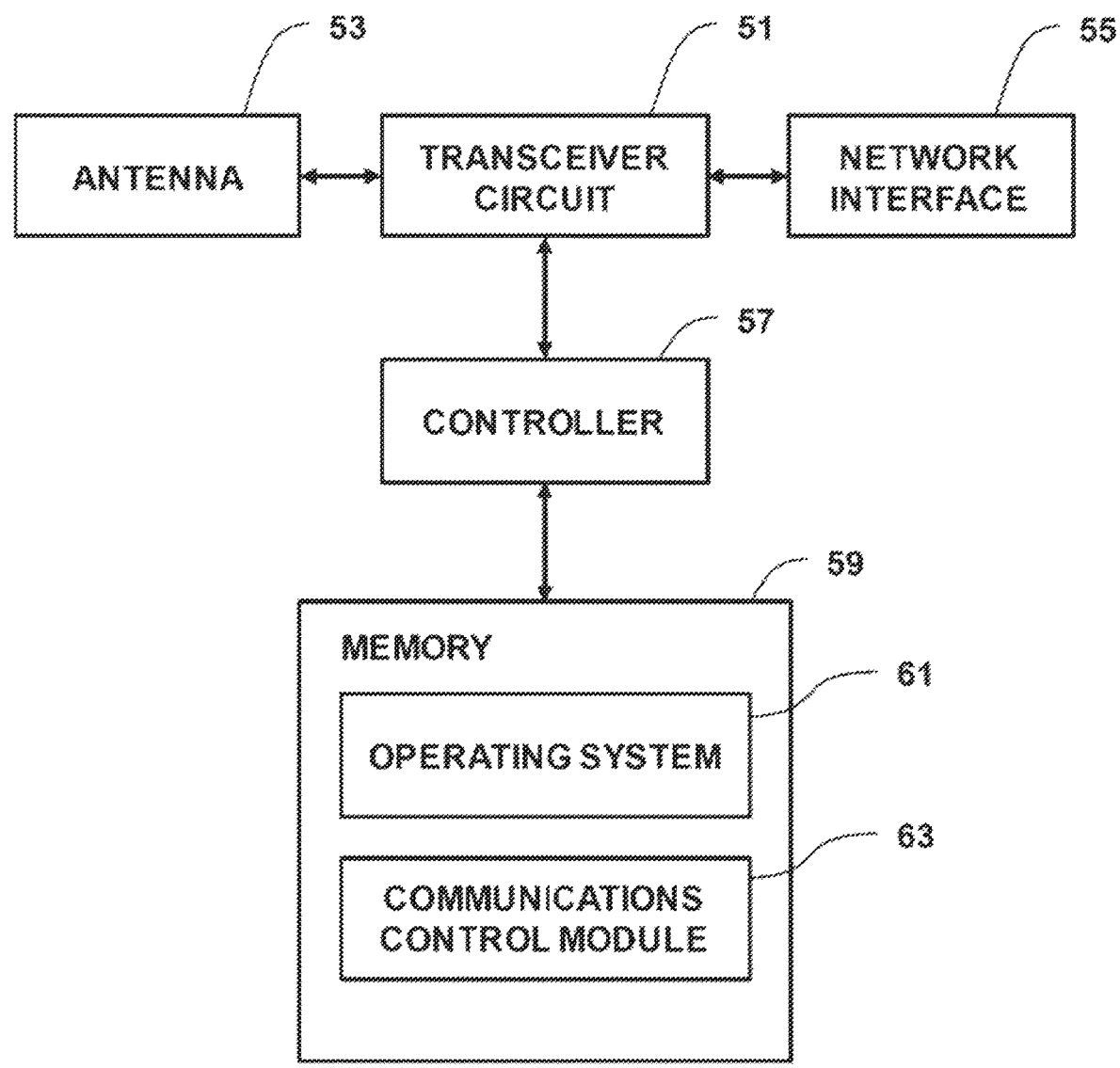
FIG. 23 is a block diagram showing an example of the configuration of (R)AN node.

FIG. 23 is a block diagram illustrating, in more detail, the main components of an exemplary (R)AN node 5 (base station) shown in FIG. 21. As shown, the (R)AN node 5 includes a transceiver circuit 51 which is operable to transmit signals to and to receive signals from connected UE(s) 3 via one or more antenna 53 and to transmit signals to and to receive signals from other network nodes (either directly or indirectly) via a network interface 55. The network interface 55 typically includes an appropriate base station— base station interface (such as X2/Xn) and an appropriate base station—core network interface (such as S1/N1/N2/N3). A controller 57 controls the operation of the (R)AN node 5 in accordance with software stored in a memory 59. The software may be pre-installed in the memory 59 and/or may be downloaded via the telecommunication network 1 or from a removable data storage device (RMD), for example. The software includes, among other things, an operating system 61 and a communications control module 63. The communications control module 63 is responsible for handling (generating/sending/receiving) signalling between the (R)AN node 5 and other nodes, such as the UE 3 and the core network nodes/network elements.

Figure 24:
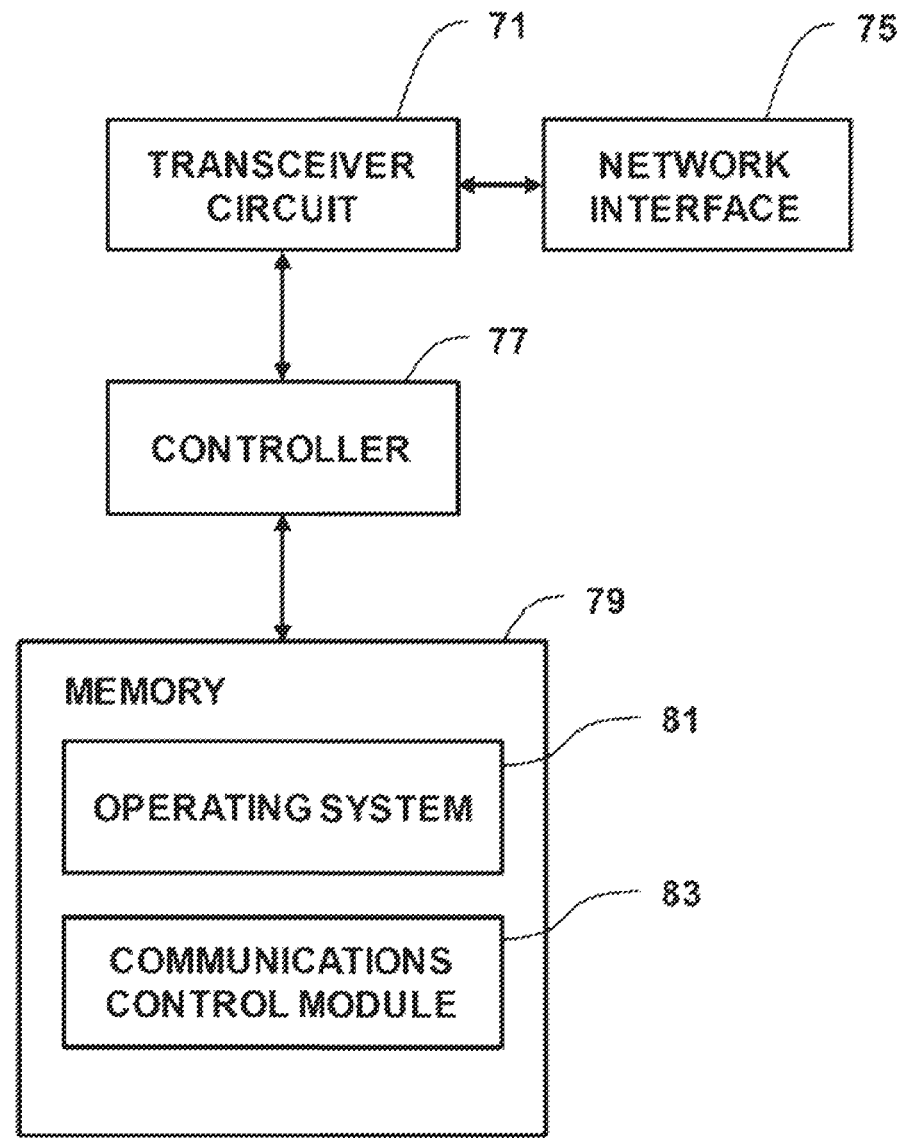
FIG. 24 is a block diagram showing an example of the configuration of core network node.

Core network node FIG. 24 is a block diagram illustrating, in more detail, the main components of a generic core network node (network element or function) shown in FIG. 21. As shown, the core network node includes a transceiver circuit 71 which is operable to transmit signals to and to receive signals from other nodes (including the UE 3 and the (R)AN node 5) via a network interface 75. A controller 77 controls the operation of the core network node in accordance with software stored in a memory 79. The software may be pre-installed in the memory 79 and/or may be downloaded via the telecommunication network 1 or from a removable data storage device (RMD), for example. The software includes, among other things, an operating system 81 and at least a communications control module 83. The communications control module 83 is responsible for handling (generating/sending/receiving) signaling between the core network node and other nodes, such as the UE 3, (R)AN node 5, and other core network nodes. Such signaling includes appropriately formatted PDUs in accordance with one of the above described embodiments.

Modifications and Alternatives

Detailed embodiments have been described above. As those skilled in the art will appreciate, a number of modifications and alternatives can be made to the above embodiments whilst still benefiting from the disclosures embodied therein. By way of illustration only a number of these alternatives and modifications will now be described.

In the above description, the UE, the (R)AN node, and the core network node are described for ease of understanding as having a number of discrete modules (such as the communication control modules). Whilst these modules may be provided in this way for certain applications, for example where an existing system has been modified to implement the disclosure, in other applications, for example in systems designed with the inventive features in mind from the outset, these modules may be built into the overall operating system or code and so these modules may not be discernible as discrete entities. These modules may also be implemented in software, hardware, firmware or a mix of these.

Each controller may comprise any suitable form of processing circuitry including (but not limited to), for example: one or more hardware implemented computer processors; microprocessors; central processing units (CPUs); arithmetic logic units (ALUs); input/output (TO) circuits; internal memories/caches (program and/or data); processing registers; communication buses (e.g. control, data and/or address buses); direct memory access (DMA) functions; hardware or software implemented counters, pointers and/or timers; and/or the like.

In the above embodiments, a number of software modules were described. As those skilled in the art will appreciate, the software modules may be provided in compiled or un-compiled form and may be supplied to the UE, the (R)AN node, and the core network node as a signal over a computer network, or on a recording medium. Further, the functionality performed by part or all of this software may be performed using one or more dedicated hardware circuits. However, the use of software modules is preferred as it facilitates the updating of the UE, the (R)AN node, and the core network node in order to update their functionalities.

The above embodiments are also applicable to 'non-mobile' or generally stationary user equipment.

Various other modifications will be apparent to those skilled in the art and will not be described in further detail here.

SUMMARY

Beneficially, the above described aspects include, although they are not limited to, one or more of the following functionalities:

Sec.2.0: Solution 0:

1) When a new DRB is set up for a UE, depending on the capability of the UP IP in itself and the other entity and the UE, the (R)AN node determines to offload the DRB to the other entity while ensuring UP IP is guaranteed in the DRB path to the UE by either: 1) requesting the other entity to handle UP IP and routing the DRB through the other entity in the DRB path to the UE, or 2) requesting the other entity to handle confidentiality protection only in the DRB path to the UE or, 3) setting up other protection method in such a way that UP IP is not needed in the DRB path to the UE, or 4) requesting the other entity to set up other protection method in such a way that UP IP is not needed in the DRB path to the UE, or 5) setting up other protection method with the UE for both the (R)AN node and the other entity in such a way that UP IP is not needed in the DRB path to the UE. Upon determining whether to offload the DRB to the other node or not, the (R)AN node takes various criteria into account.

Sec.2.1: Solution 2 Variants:

1) When a new DRB is set up for a UE, the MN ensures that the UP IP is guaranteed under all MR-DC scenarios. In EN-DC and NGEN-DC scenarios, it is done by setting up the DRB path to be routed through the SN (gNB) where the UP IP can be supported. Both UL and DL DRBs that are terminated at the MN (eNB) are forwarded over the X2 (EN-DC scenario) or Xn (NGEN-DC and NE-DC scenarios).

2) In NE-DC scenario, UP IP is guaranteed by splitting up the PDCP layer functionality between the MN and SN. The MN (gNB) applies the integrity protection, while the SN (eNB) applies the confidentiality protection in both UL and DL directions. With this way, the decision to offload DRB to the SN can be done even if the eNB does not support UP IP. At this time, the MN generates a separate confidentiality protection key and provide it to the SN so that only the confidentiality protection is handled in the SN. At the same time, the confidentiality protection at the MN is disabled. In the uplink direction, the UE applies UP IP using the key in MN and ciphering using the derived keys in SN. In downlink direction, the MN applies UP IP using the key in MN and the SN applies the ciphering using the derived confidentiality protection key.

Sec.2.2 Solution 2 Variants:

1) The network requests the UE to establish IPsec tunnel with the network node. Sending DRB traffic through the IPsec tunnel conceals the deficiency of the 4G Uu interface not able to apply UP IP due to the absence of UP IP functionality over 4G Uu interface.

2) The network requests the UE to establish IPsec tunnel with the network node. Sending DRB traffic through the IPsec tunnel conceals the deficiency of requiring the conscious handling of the difference between 4G Uu interface and 5G Uu interface with respect to the support (or absence of support).

3) The network instructs the UE to establish IPsec tunnel between the UE and the network over 4G Uu interfaces to protect the DRB over 4G Uu interface.

4) The network instructs the UE to establish IPsec tunnel to between the UE and the network over both 4G Uu and 5G Uu interfaces to protect the DRB over both 4G and 5G Uu interfaces.

Sec.2.3 Solution 3:

1) The eNB establishes the 4G Uu interface with the UE using the RN Uu interface. Sending DRB traffic through the RN Uu interface conceals the deficiency of not able to apply UP IP in 4G (LTE) Uu interface due to the absence of UP IP functionality over 4G Uu interface, Sec.2.4 Solution 4 Variants:

1) The UE provides its capability of maximum UP IP data rate to the network. 2) The eNB and gNB (MN or SN depending on the DC scenario) communicate and share the UE's supported UP IP capabilities, so that both eNB and gNB can apply the same security policy to the UE, including the use of UP IP.

In order to provide these functionalities, the above aspects describe exemplary methods comprising (at least some of) the following steps:

Sec. 2.0 Solution 0:

1) When a new DRB is set up for a UE, the (R)AN node requests the other entity to set up the DRB path so that all the eNB, gNB and UE can use UP IP on the DRB path.

2) The other entity establishes DRB path and responds back to the (R)AN node for the successful establishment of DRB path with UP IP protection.

Sec. 2.1 Solution 1 Variant 1:

1) The MN (eNB in EN-DC and NGEN-DC scenarios) determines to offload the DRB to SN. At this time, the MN requests the SN to apply UP IP to the DRB.

2) The SN accepts the offloading of DRB and starts to apply UP IP to the offloaded DRB.

3) The MN forwards the DL DRB to the SN.

4) The SN applies UP IP to the DL DRB and forwards it to the UE.

5) The UE verifies the UP IP in the received DL DRB.

6) The UE sends UL DRB to the SN.

7) The SN verifies the UP IP in the received UL DRB, and forwards it to the MN.

8) The MN forwards the UL DRB to the CN.

Sec. 2.1 Solution 1 Variant 2:

1) The MN (gNB in NE-DC scenario) determines to offload the DRB to SN. At this time, the MN requests the SN to apply confidentiality protection only to the DRB.

2) The SN accepts the offloading of the DRB and starts to apply confidentiality protection to the offloaded DRB.

3) The MN applies UP IP and forwards the DL DRB to the SN.

4) The SN applies confidentiality protection to the DL DRB and forwards it to the UE.

5) The UE verifies the UP IP in the received DL DRB.

6) The UE sends UL DRB to the SN.

7) The SN verifies the confidentiality protection in the received UL DRB, and forwards it to the MN.

8) The MN verifies the UP IP and forwards the UL DRB to the CN

Sec. 2.2: Solution 2 Variant 1:

1) The MN (gNB in NE-DC scenario) determines to offload the DRB to SN. At this time, the MN requests to apply IPsec tunnel to the Uu interface.

2) The SN (alternatively MN) requests the UE to establish IPsec tunnel to the network. 3) The SN (alternatively MN) receives the DL DRB from the CN and forwards it to the UE over IPsec tunnel.

4) The UE sends UL DRB to the SN (alternatively MN) over IPsec tunnel, and the SN forwards it to the CN.

Sec. 2.2: Solution 2 Variant 2:

1) The MN (applicable to all DC scenarios) determines to offload the DRB to SN. At this time, the CN requests the network element (UPST) to create IPsec tunnel key.

2) The CN transfers the IPsec tunnel key to the UE.

3) The CN requests the MN to use IPsec tunnel with the UE to protect Uu interface traffic to both eNB and gNB.

4) The MN determines to offload the DRB to the SN.

5) The SN requests the UE to establish IPsec tunnel with the network.

6) The UE establishes IPsec tunnel with the network.

7) The SN receives the DL DRB from the CN and forwards it to the UE over IPsec tunnel.

8) The UE sends UL DRB to the SN over IPsec tunnel, and the SN forwards it to the CN.

Sec. 2.3: Solution 3:

1) The eNB (MN or SN depending on the DC scenario) establishes the 4G Uu interface with the UE as the RN link in which UP IP is supported by default.

Sec. 2.4: Solution 4:

1) The UE sends the UE capability information on the supported maximum data rate for UP IP to the eNB or gNB (MN or SN depending on the DC scenario) and derive the UP IP rule to the UE based on the received information.

2) The eNB and gNB share the UE capability information and UP IP rule with each other.

3) Both eNB and gNB apply the same UP IP rule to the UE.

Benefits

The current state-of-the-art (as discussed in the background section earlier in this disclosure) leaves the decision of whether to accept or reject the PDU session establishment at the (R)AN node (eNB, gNB) depending on: 1) the UE security policy set forth by the SMF (UP IP is "required", "preferred", or "not needed"), and the MR-DC variant (EN-DC, NGEN-DC, or NE-DC) being used. In other words, not all PDU session establishment attempt are accepted. This is due to the fact that there is an imbalance in the support of UP IP between 4G (R)AN node (eNB) and 5G (R)AN node (gNB).

The solutions and their variants presented in this disclosure prevent the rejection of PDU session establishment. This is done by either: 1) avoiding the UP IP in 4G (R)AN node (eNB), or 2) making the absence of UP IP functionality in 4G (R)AN nodes irrelevant by satisfying the security requirement (including UP IP) by some other means, e.g. establishing IPsec tunnel in the Uu interface. As a result, by using the mechanisms presented in this disclosure will allow PDU establishment successful under all circumstances irrespective of: 1) the UE security policy set forth by the SMF (UP IP is "required", "preferred", or "not needed"), and the MR-DC variant (EN-DC, NGEN-DC, or NE-DC) being used.

CITATION LIST

Non Patent Literature

[NPL 1] 3GPP TS 37.340, V15.3.0, "NR; Multi-connectivity; Overall description; Stage-2"

[NPL 2] 3GPP TS 33.401, V15.6.0, "3GPP System Architecture Evolution (SAE); Security architecture"

[NPL 3] 3GPP TS 33.501, V15.3.0, "Security architecture and procedures for 5G system"

[NPL 4] 3GPP TS 36.323, V15.1.0, "E-UTRA Packet Data Convergence Protocol (PDCP)"

[NPL 5] 3GPP TS 38.323, V15.3.0, "NR Packet Data Convergence Protocol (PDCP)"

[NPL 6] 3GPP TS 36.331, V15.3.0, "E-UTRA Radio Resource Control (RRC)"

This application is based upon and claims the benefit of priority from European patent application No. 19156267.7, filed on Feb. 8, 2019, the disclosure of which is incorporated herein in its entirely by reference.

REFERENCE SIGNS LIST

1 TELECOMMUNICATION SYSTEM
3 MOBILE DEVICE
31 TRANSCEIVER CIRCUIT
33 ANTENNA
35 USER INTERFACE
37 CONTROLLER
39 MEMORY
41 OPERATING SYSTEM
43 COMMUNICATION CONTROL MODULE
5 BASE STATION
51 TRANSCEIVER CIRCUIT
53 ANTENNA
55 NETWORK INTERFACE
57 CONTROLLER
59 MEMORY
61 OPERATING SYSTEM
63 COMMUNICATION CONTROL MODULE
7 CORE NETWORK
10 CPF
11 UPF
71 TRANSCEIVER CIRCUIT
75 NETWORK INTERFACE
77 CONTROLLER
79 MEMORY
81 OPERATING SYSTEM
83 COMMUNICATION CONTROL MODULE
20 EXTERNAL IP NETWORK

What is claimed is:

1. A method of a Next Generation Evolved Node-B (ng-eNB) that acts as a secondary node in dual connectivity, the method comprising:
    receiving, from an NR Node B (gNB) that acts as a master node, a request message;
    sending, to the gNB, an acknowledgement message with an indication, the indication relating to User Plane (UP) integrity protection of traffic between the ng-eNB and a User Equipment (UE); and
    activating the UP integrity protection, wherein the ng-eNB provides an Evolved Universal Terrestrial Radio Access (E-UTRA) UP protocol termination toward the UE and connects to a 5G Core Network (5GC), and the gNB provides an NR Radio Access (NR) UP protocol termination toward the UE and connects to the 5GC.

2. A Next Generation Evolved Node-B (ng-eNB) that acts as a secondary node in dual connectivity, the ng-eNB comprising:
    at least one processor; and
    at least one memory coupled to the at least one processor, the at least one memory storing instructions that when executed by the at least one processor cause the at least one processor to:
    receive, from an NR Node B (gNB) that acts as a master node, a request message;
    send, to the gNB, an acknowledgement message with an indication, the indication relating to User Plane (UP) integrity protection of traffic between the ng-eNB and a User Equipment (UE); and
    activate the UP integrity protection, wherein the ng-eNB provides an Evolved Universal Terrestrial Radio Access (E-UTRA) UP protocol termination toward the UE and connects to a 5G Core Network (5GC), and the gNB provides an NR Radio Access (NR) UP protocol termination toward the UE and connects to the 5GC.

\* \* \* \* \*